US007572875B2

(12) United States Patent  (10) Patent No.: US 7,572,875 B2
Jensen et al.  (45) Date of Patent: Aug. 11, 2009

(54) ETHYLENE HOMOPOLYMERS OR COPOLYMERS HAVING GOOD MACHINE DIRECTION (MD) ELMENDORF TEAR STRENGTH

(75) Inventors: Michael D. Jensen, Bartlesville, OK (US); Joel L. Martin, Bartlesville, OK (US); Max P. McDaniel, Bartlesville, OK (US); Qing Yang, Bartlesville, OK (US); Matthew G. Thorn, Bartlesville, OK (US); Elizabeth A. Benham, Spring, TX (US); Ted H. Cymbaluk, Kemah, TX (US); Ashish M. Sukhadia, Bartlesville, OK (US); Rajendra K. Krishnaswamy, Bartlesville, OK (US); Mark E. Kertok, Bartlesville, OK (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 143 days.

(21) Appl. No.: 11/446,917

(22) Filed: Jun. 5, 2006

(65) Prior Publication Data

US 2006/0229420 A1 Oct. 12, 2006

Related U.S. Application Data

(62) Division of application No. 10/762,056, filed on Jan. 21, 2004, now Pat. No. 7,119,153.

(51) Int. Cl.
*C08F 10/02* (2006.01)
*C08F 210/16* (2006.01)

(52) U.S. Cl. .................. 526/348; 526/352; 528/396

(58) Field of Classification Search ................ 526/352, 526/352.2, 348; 528/396
See application file for complete search history.

(56) References Cited

U.S. PATENT DOCUMENTS

| | | | |
|---|---|---|---|
| 3,334,119 A | 8/1967 | Cohen | |
| 3,431,288 A | 3/1969 | Gibbons et al. | |
| 4,530,914 A | 7/1985 | Ewen et al. | |
| 4,564,647 A | 1/1986 | Hayashi et al. | |
| 4,594,211 A | 6/1986 | Mohnhaupt | |
| 4,851,478 A | 7/1989 | Su | |
| 4,897,455 A | 1/1990 | Welborn, Jr. | |
| 4,937,299 A | 6/1990 | Ewen et al. | |
| 4,939,217 A | 7/1990 | Stricklen | |
| 5,049,535 A | 9/1991 | Resconi et al. | |
| 5,198,401 A | 3/1993 | Turner et al. | |
| 5,258,475 A | 11/1993 | Kissin | |
| 5,281,679 A | 1/1994 | Jejelowo et al. | |
| 5,324,800 A | 6/1994 | Welborn, Jr. et al. | |
| 5,359,015 A | 10/1994 | Jejelowo | |
| 5,369,196 A | 11/1994 | Matsumoto et al. | |
| 5,370,940 A | 12/1994 | Hazlitt et al. | |
| 5,374,700 A | 12/1994 | Tsutsui et al. | |
| 5,384,299 A | 1/1995 | Turner et al. | |
| 5,422,325 A | 6/1995 | Jejelowo et al. | |
| 5,470,927 A | 11/1995 | Turner et al. | |
| 5,504,049 A | 4/1996 | Crowther et al. | |
| 5,561,092 A | 10/1996 | Ewen et al. | |
| 5,565,592 A | 10/1996 | Patsidis et al. | |
| 5,576,259 A | 11/1996 | Hasegawa et al. | |
| 5,580,939 A | 12/1996 | Ewen et al. | |
| 5,585,418 A | 12/1996 | Nagata | |
| 5,607,890 A | 3/1997 | Chen et al. | |
| 5,612,271 A | 3/1997 | Zandona | |
| 5,616,665 A | 4/1997 | Jejelowo et al. | |
| 5,631,335 A | 5/1997 | Alt et al. | |
| 5,633,394 A | 5/1997 | Welborn, Jr. et al. | |
| 5,637,744 A | 6/1997 | Alt et al. | |
| 5,639,835 A | 6/1997 | Jelelowo | |
| 5,710,224 A * | 1/1998 | Alt et al. ................ 526/160 |
| 5,719,241 A | 2/1998 | Razavi et al. | |
| 5,721,327 A | 2/1998 | Santi et al. | |
| 5,726,134 A | 3/1998 | Adams | |
| 5,726,332 A | 3/1998 | Eisch et al. | |
| 5,763,349 A | 6/1998 | Zandona | |
| 5,770,664 A | 6/1998 | Okumura et al. | |
| 5,773,106 A | 6/1998 | DeGroot et al. | |
| 5,786,291 A | 7/1998 | Speca et al. | |
| 5,789,638 A | 8/1998 | Hahn et al. | |
| 5,798,427 A | 8/1998 | Foster et al. | |

(Continued)

FOREIGN PATENT DOCUMENTS

| | | |
|---|---|---|
| BE | 635987 | 2/1964 |
| DE | 1105416 | 4/1961 |
| EP | 0 619 325 | 10/1994 |
| EP | 0 643 084 | 3/1995 |
| EP | 0 683 180 | 11/1995 |

(Continued)

OTHER PUBLICATIONS

U.S. Appl. No. 10/994,828; Office Action dated Jun. 14, 2007.
U.S. Appl. No. 10/994,828; Office Action dated Nov. 29, 2007.
Gorsich, R., "Preparation and Properties of Cyclopentadienyltitanium Trichloride," 15th SW Reg. Meeting of the American Chem. Society, vol. 82, , pp. 4211-4214 [Baton Rouge Dec. 3, 1958].

(Continued)

*Primary Examiner*—David Wu
*Assistant Examiner*—Rip A. Lee
(74) *Attorney, Agent, or Firm*—Merchant & Gould, P.C.

(57) ABSTRACT

This invention relates to catalyst compositions comprising a first metallocene compound, a second metallocene compound, at least one chemically-treated solid oxide, and at least one organoaluminum compound. This invention also relates to methods to prepare and use the catalyst compositions and new polyolefins. The compositions and methods disclosed herein provide ethylene polymers and copolymers with lower MI, increased melt strength, and good MD tear properties.

21 Claims, No Drawings

U.S. PATENT DOCUMENTS

| | | | |
|---|---|---|---|
| 5,807,938 A | 9/1998 | Kaneko et al. | |
| 5,817,590 A | 10/1998 | Hasegawa et al. | |
| 5,846,896 A | 12/1998 | Ewen | |
| 5,847,059 A | 12/1998 | Shamshoum et al. | |
| 5,863,853 A | 1/1999 | Vaugham | |
| 5,891,814 A | 4/1999 | Richeson et al. | |
| 5,895,771 A | 4/1999 | Epstein et al. | |
| 5,906,955 A | 5/1999 | Hamura et al. | |
| 5,912,202 A | 6/1999 | Oskam et al. | |
| 5,919,983 A | 7/1999 | Rosen et al. | |
| 5,942,459 A | 8/1999 | Sugano et al. | |
| 5,962,362 A | 10/1999 | Wasserman | |
| 6,034,187 A | 3/2000 | Maehama et al. | |
| 6,069,109 A | 5/2000 | Kao et al. | |
| 6,107,230 A | 8/2000 | McDaniel et al. | |
| 6,117,957 A | 9/2000 | Ewen | |
| 6,121,394 A | 9/2000 | Sugimoto et al. | |
| 6,139,930 A | 10/2000 | Comer et al. | |
| 6,143,854 A | 11/2000 | Bamburger et al. | |
| 6,153,716 A * | 11/2000 | Welch et al. | 526/352 |
| 6,159,617 A | 12/2000 | Foster et al. | |
| 6,159,889 A | 12/2000 | Wasserman | |
| 6,165,929 A | 12/2000 | McDaniel et al. | |
| 6,166,154 A | 12/2000 | Oskam et al. | |
| 6,180,731 B1 | 1/2001 | Rohde et al. | |
| 6,197,900 B1 | 3/2001 | Seelert et al. | |
| 6,207,606 B1 | 3/2001 | Lue et al. | |
| 6,207,774 B1 | 3/2001 | Hasegawa et al. | |
| 6,214,948 B1 | 4/2001 | Zandona | |
| 6,218,487 B1 | 4/2001 | Van Tol | |
| 6,232,261 B1 | 5/2001 | Little | |
| 6,239,059 B1 | 5/2001 | Saudemont et al. | |
| 6,245,705 B1 | 6/2001 | Kissin | |
| 6,245,868 B1 | 6/2001 | Agapiou et al. | |
| 6,255,244 B1 | 7/2001 | Yabunouchi | |
| 6,255,410 B1 | 7/2001 | Shigekauzu et al. | |
| 6,255,417 B1 | 7/2001 | Oh et al. | |
| 6,255,426 B1 | 7/2001 | Lue et al. | |
| 6,258,903 B1 | 7/2001 | Mawson et al. | |
| 6,262,200 B1 | 7/2001 | Marks et al. | |
| 6,265,339 B1 | 7/2001 | Bidell et al. | |
| 6,271,322 B1 | 8/2001 | McCullough et al. | |
| 6,281,309 B1 | 8/2001 | Babcock et al. | |
| 6,300,271 B1 | 10/2001 | McDaniel et al. | |
| 6,300,432 B1 | 10/2001 | Ford et al. | |
| 6,300,451 B1 | 10/2001 | Mehta et al. | |
| 6,303,718 B1 | 10/2001 | Becke et al. | |
| 6,319,995 B2 | 11/2001 | Glenn et al. | |
| 6,319,997 B1 | 11/2001 | Kendrick et al. | |
| 6,320,002 B1 | 11/2001 | Murray et al. | |
| 6,326,444 B2 | 12/2001 | Lynch et al. | |
| 6,340,652 B1 | 1/2002 | Sugano et al. | |
| 6,340,728 B1 | 1/2002 | Oh et al. | |
| 6,346,586 B1 | 2/2002 | Agapiou et al. | |
| 6,353,064 B1 | 3/2002 | Ostoja-Starzweski | |
| 6,355,594 B1 | 3/2002 | McDaniel et al. | |
| 6,355,742 B1 | 3/2002 | Oh et al. | |
| 6,359,083 B1 | 3/2002 | Dooley et al. | |
| 6,359,086 B1 | 3/2002 | Kristen et al. | |
| 6,376,415 B1 | 4/2002 | McDaniel et al. | |
| 6,380,328 B1 | 4/2002 | McConville et al. | |
| 6,384,158 B1 | 5/2002 | Bamberger et al. | |
| 6,388,017 B1 | 5/2002 | McDaniel et al. | |
| 6,395,666 B1 | 5/2002 | McDaniel et al. | |
| 6,395,847 B2 | 5/2002 | Chang | |
| 6,399,722 B1 | 6/2002 | Szul et al. | |
| 6,410,657 B1 | 6/2002 | Ko et al. | |
| 6,417,299 B1 | 7/2002 | Ford et al. | |
| 6,417,304 B1 | 7/2002 | McConville et al. | |
| 6,492,472 B2 | 12/2002 | Lue et al. | |
| 6,512,019 B1 | 1/2003 | Agarwal et al. | |
| 6,518,385 B1 | 2/2003 | Chai | |
| 6,524,987 B1 | 2/2003 | Collins et al. | |
| 6,531,550 B1 | 3/2003 | McDaniel et al. | |
| 6,541,413 B1 | 4/2003 | Razavi et al. | |
| 6,559,090 B1 | 5/2003 | Shih et al. | |
| 6,562,920 B2 | 5/2003 | Brant | |
| 6,583,227 B2 | 6/2003 | Mehta et al. | |
| 6,613,852 B2 | 9/2003 | McDaniel et al. | |
| 6,632,901 B2 | 10/2003 | McCullough | |
| 6,667,274 B1 | 12/2003 | Hawley et al. | |
| 6,720,396 B2 | 4/2004 | Bell et al. | |
| 6,753,390 B2 | 6/2004 | Ehrman et al. | |
| 6,825,369 B1 | 11/2004 | Stevens et al. | |
| 6,831,141 B2 | 12/2004 | McDaniel et al. | |
| 6,833,338 B2 * | 12/2004 | McDaniel et al. | 502/104 |
| 6,875,828 B2 | 4/2005 | Kuo et al. | |
| 6,982,306 B2 | 1/2006 | Martin et al. | |
| 7,041,617 B2 | 5/2006 | Jensen et al. | |
| 2002/0004566 A1 | 1/2002 | Ford et al. | |
| 2002/0143123 A1 | 10/2002 | Dekmezian | |
| 2003/0105237 A1 | 6/2003 | Winter et al. | |
| 2003/0130443 A1 | 7/2003 | Suhm et al. | |
| 2003/0236364 A1 | 12/2003 | McCullough et al. | |
| 2004/0006186 A1 | 1/2004 | Jensen et al. | |
| 2004/0048990 A1 | 3/2004 | Brinen et al. | |

FOREIGN PATENT DOCUMENTS

| | | |
|---|---|---|
| EP | 1 312 625 | 5/1996 |
| EP | 0 741 146 | 11/1996 |
| EP | 0 743 327 | 11/1996 |
| EP | 0 785 220 | 7/1997 |
| EP | 0 927 201 | 7/1999 |
| EP | 0 989 141 | 3/2000 |
| JP | 11279189 A2 | 10/1999 |
| WO | WO 96/012762 | 5/1996 |
| WO | WO 99/035174 | 7/1999 |
| WO | WO 99/060033 | 11/1999 |
| WO | WO 01/062847 | 8/2001 |
| WO | WO 02/077043 | 10/2002 |
| WO | WO 04/055061 | 7/2004 |

OTHER PUBLICATIONS

Dickson, R. et al., "The Reaction Of Alkali Metal Derivatives Of Group IV Metal Alkyls With Bis (Cyclopentadienyl) Titanium(IV) Dichloride,"0 Australian J. of Chem., vol. 14, pp. 555-561 [Melbourne, Australia—1961].

Wailes, P. C. et al., "Organometallic Chemistry of Titanium, Zirconium and Hafnium", pp. 89, 91, 92, 50, 151, 155, [Academic Press NY 1974].

Suzuki, et al., "Preparation and Some Properties of Triogranosiloxy Derivatives of Cyclopentadienyl Titanium", Bulletin Of The Chemical Society Of Japan, vol. 48:9, pp. 2460-2461 [Japan—1975].

Broyer et al, "Analysis of Molecular Weight Distribution Using Multicomponent Models", Computer Applications in Applied Polymer Science, pp. 45-64, [Amer. Chem. Society—1982].

Cardin, D.J. et al., Chemistry of Organo-Zirconium and Hafnium Compounds, pp. 145-160 [Halstead Press NY 1986].

Kajigaeshi, S., "Selective Preparation of Fluorene Derivatives Using the t-Butyl Function as a Positional Protective Group," Bull. Chem. Soc. Japan., vol. 59, pp. 97-103 [The Chemical Society of Japan—Jan. 1986].

Marks, T., "Surface-Bound Metal Hydrocarbyls. Organmetallic Connections Between Herterogeneous & Homogeneous Catalysis", Accts. of Chem. Res., vol. 25:2, pp. 57-65 [Feb. 1992].

Nomura, K. et al., Synthesis Of Various Nonbridged Titanium(IV) Cyclopentadienyl-Aryloxy Complexes Of The Type CpTi(OAr)X2 And Their Use In The Catalysis Of Alkene.

Malmberg, A., "Long-Chain Branched Polyethelyne (SP???) Polymerized by Metallocene Catalysts . . . ", Macromolecules, vol. 31:24, pp. 8448-8454 [Dec. 1, 1998].

Alt, H. et al., C1-verbrückte Fluorenyliden-Indenylidenkomplese des Typs (C13H8-CR2-C9H6-nR'n)ZrCl2 (n=0, 1: R=Me, Ph, Butenyl; R'=Alkyl, Alkenyl) als.

Alt, H. et al., C1-Bridged Fluorenylidene Cyclopentadienylidene Compleses of the Type (C13H8-CR1R2-C5H3R)ZrCl2 (R1R2=alkyl, phenyl, alkenyl; R=H, alkyl, alkenyl, substituted.

Silva et al., "Synthesis and X-ray Crystal Structure Elucidation of An Organometallic Oxide Containing Nb and Sn", Polyhedron, vol. 18:22, pp. 2823-2862 [1999].

Jezequel, M. et al., Supported Metallocene Catalysts by Surface Organometallic Chemistry. Synthesis, Characterization . . . , J. Am. Chem. Soc., vol. 123:15, pp. 3520-3540 [2001].

Köppl, Alexander; Alt, Helmut G., "Heterogeneous Metallocene Catalysts For Ethylene Ploymerization," Journal of Molecular Catalysis A: Chemical, vol. 165, pp. 23-32 [2001].

Sukhadia, A. et al. "Optical Haze Properties of Polyethylene Blown Films: Part 2—The Origins of Various Surface Roughness Mechanism", ANTEC 2001, 1931-1934 [2001].

Ahn, H., Surface Organozirconium Electrophiles Activated by Chemisorption on "Super Acidic" Sulfated Zirconia as Hydrogenation and Polymerization Catalysts. A Synthetic, Structural.

Charoenchaidet, S., et al., Methylaluminoxane-Free Ethylene Polymerization With In Situ Activated Zirconocene Triisobutylaluminum Catalysts And Silica-Supported Stabilized Borate.

Das, P.K., "Computational Chemistry of Metallocene Catalyzed Olefin Polymerization", 21st Century Symp. at S.W. Reg. Amer. Chem. Soc. Mtg. [Oklahoma—Oct. 26-28, 2003].

International Search Report and Written Opinion, PCT/US05/000278, Aug. 2, 2005.

Hieber, C.A., et al., "Some correlations involving the shear viscosity of polystyrene melts," Rheologica Acta, vol. 28, No. 4 (1989), pp. 321-332.

Hieber, C.A., et al., "Shear-Rate-Dependence Modeling of Polymer Melt Viscosity," Polymer Engineering and Science, Jul. 1992, vol. 32, No. 14, pp. 931-938.

Bird, R. Byron, et al., Dynamics of Polymeric Liquids, vol. 1, Fluid Mechanics, (1987), pp. 171-172.

\* cited by examiner

ETHYLENE HOMOPOLYMERS OR COPOLYMERS HAVING GOOD MACHINE DIRECTION (MD) ELMENDORF TEAR STRENGTH

REFERENCE TO RELATED APPLICATIONS

This application is a divisional application of U.S. patent application Ser. No. 10/762,056, filed on Jan. 21, 2004, now U.S. Pat. No. 7,119,153, which is incorporated herein by reference in its entirety.

TECHNICAL FIELD OF THE INVENTION

This invention relates to the field of olefin polymerization catalysis, catalyst compositions, methods for the polymerization and copolymerization of olefins, polyolefins, and film resins, particularly using a supported catalyst composition.

BACKGROUND OF THE INVENTION

It is known that mono-1-olefins (α-olefins), including ethylene, can be polymerized with catalyst compositions employing titanium, zirconium, vanadium, chromium, or other metals, often combined with a solid oxide and in the presence of cocatalysts. These catalyst compositions may be useful for both homopolymerization of ethylene, as well as copolymerization of ethylene with comonomers such as propylene, 1-butene, 1-hexene, or other higher α-olefins. Therefore, there exists a constant search to develop new olefin polymerization catalysts, catalyst activation processes, and methods of making and using catalysts, that will provide enhanced catalytic activities and polymeric materials tailored to specific end uses.

One type of transition metal-based catalyst system comprises metallocene compounds, which have shown promise in tailoring polymer properties. However, there remain significant challenges in developing catalysts that can provide custom-made polymers with a specific set of desired properties. Further, it is of interest to develop metallocene-based catalytic systems that can be activated with activating agents that do not require relatively expensive methylaluminoxane, yet still provide relatively high polymerization activities.

What are needed are new catalyst compositions and methods of making the catalyst compositions that afford high polymerization activities, and will allow polymer properties to be maintained within the desired specification ranges.

SUMMARY OF THE INVENTION

This invention encompasses catalyst compositions, methods for preparing catalyst compositions, methods for polymerizing olefins, ethylene polymers and copolymers, and films. In the course of examining metallocene-based olefin polymerization catalysts, it was discovered that a dual metallocene catalyst system provided a useful combination of polyolefin properties, such as melt index, haze, MD tear, and the like, while maintaining sufficient melt strength so the resin is suitable for blowing film.

In one aspect, the present invention encompasses a composition of matter comprising a first metallocene compound, a second metallocene compound, at least one chemically-treated solid oxide, and at least one organoaluminum compound. In another aspect, this invention encompasses a catalyst composition, a catalyst composition for polymerizing olefins, a method of preparing a catalyst composition, a method of using a catalyst composition, and the like, in each case encompassing a first metallocene compound, a second metallocene compound, at least one chemically-treated solid oxide, and at least one organoaluminum compound.

In one aspect, the present invention comprises a dual metallocene catalyst composition, wherein the first metallocene compound can comprise a bis(monosubstituted cycloalkadienyl)zirconium complex; the second metallocene can comprise a bis(disubstituted cycloalkadienyl)zirconium complex or a similar metallocene compound more highly substituted than the first metallocene compound, a chemically-treated solid oxide component; and an organoaluminum compound. In still another aspect of this invention, the second metallocene compound can comprise a loosely-bridged ansa-metallocene, wherein the two cyclopentadienyl-type ligands are connected by a substituted or unsubstituted bridging group comprising from 3 to 5 contiguous ansa carbon atoms in a chain, one end of which is bonded to one of the cyclopentadienyl-type ligands, and the other end of which is bonded to the other cyclopentadienyl-type ligand. In still another aspect of the invention, the second metallocene compound can comprise a bis(monosubstituted cycloalkadienyl)hafnium compound, similar in structure to the first metallocene compound of zirconium. In yet another aspect, the dual metallocene catalyst composition can comprise a first metallocene compound and any combination of second metallocene compounds, including any combination of more than one of the same type or different types of second metallocene compounds.

In one aspect, the catalyst composition of this invention comprises a first metallocene compound, a second metallocene compound, at least one chemically-treated solid oxide, and at least one organoaluminum compound, wherein:

a) the first metallocene compound has the following formula:

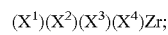

$(X^1)(X^2)(X^3)(X^4)Zr;$ wherein $(X^1)$ and $(X^2)$ are independently selected from a monosubstituted cyclopentadienyl, a monosubstituted indenyl, a monosubstituted fluorenyl, or a monosubstituted, partially saturated analog thereof;

wherein each substituent on $(X^1)$ and $(X^2)$ is independently selected from a linear or branched aliphatic group, wherein the aliphatic group is unsubstituted or substituted, any one of which having from 1 to about 20 carbon atoms;

wherein $(X^3)$, $(X^4)$, and any substituent on the substituted aliphatic group on $(X^1)$ and $(X^2)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

b) wherein the second metallocene compound has the following formula:

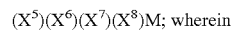

$(X^5)(X^6)(X^7)(X^8)M;$ wherein

1) M is Zr;
   $(X^5)$ and $(X^6)$ are independently selected from a substituted cyclopentadienyl, a substituted indenyl, a substituted fluorenyl, or a substituted, partially saturated analog thereof, wherein at least one of $(X^5)$ and $(X^6)$ is at least disubstituted; and
   each substituent on $(X^5)$ and $(X^6)$ is independently selected from a linear or branched aliphatic group, wherein the aliphatic group is unsubstituted or substituted, any one of which having from 1 to about 20 carbon atoms;

2) M is Zr;

($X^5$) and ($X^6$) are independently selected from a cyclopentadienyl, an indenyl, a fluorenyl, a partially saturated analog thereof, or a substituted analog thereof; and ($X^5$) and ($X^6$) are connected by a substituted or unsubstituted bridging group comprising from 3 to 5 contiguous ansa carbon atoms in a chain, one end of which is bonded to ($X^5$) and the other end of which is bonded to ($X^6$); or 3) M is Hf;

($X^5$) and ($X^6$) are independently selected from a monosubstituted cyclopentadienyl, a monosubstituted indenyl, a monosubstituted fluorenyl, or a monosubstituted, partially saturated analog thereof; and each substituent on ($X^5$) and ($X^6$) is independently selected from a linear or branched aliphatic group, wherein the aliphatic group is unsubstituted or substituted, any one of which having from 1 to about 20 carbon atoms; and wherein ($X^7$), ($X^8$), any substituent on ($X^5$), any substituent on ($X^6$), any substituent on the substituted aliphatic group on ($X^5$) and ($X^6$), and any substituent on the substituted bridging group connecting ($X^5$) and ($X^6$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen; and c) the chemically-treated solid oxide comprises a solid oxide treated with an electron-withdrawing anion.

In another aspect of this invention, the organoaluminum compound can have the following formula:

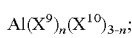

wherein ($X^9$) is a hydrocarbyl having from 1 to about 20 carbon atoms; ($X^{10}$) is selected from alkoxide or aryloxide having from 1 to about 20 carbon atoms, halide, or hydride; and n is a number from 1 to 3, inclusive.

In another aspect of this invention, the second metallocene compound can have the following formula:

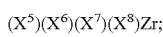

wherein ($X^5$) and ($X^6$) are independently selected from a substituted cyclopentadienyl, a substituted indenyl, a substituted fluorenyl, or a substituted, partially saturated analog thereof, wherein at least one of ($X^5$) and ($X^6$) is at least disubstituted;

wherein each substituent on ($X^5$) and ($X^6$) is independently selected from a linear or branched aliphatic group, wherein the aliphatic group is unsubstituted or substituted, any one of which having from 1 to about 20 carbon atoms;

wherein ($X^7$), ($X^8$), and any substituent on the substituted aliphatic group on ($X^5$) and (X6) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen. In another aspect, when the second metallocene compound has this formula, both ($X^5$) and ($X^6$) may be at least disubstituted.

In yet another aspect, the second metallocene compound can be an ansa-metallocene having the following formula:

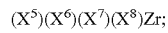

wherein ($X^5$) and ($X^6$) are independently selected from a cyclopentadienyl, an indenyl, a fluorenyl, a partially saturated analog thereof, or a substituted analog thereof; wherein ($X^5$) and ($X^6$) are connected by a substituted or unsubstituted bridging group comprising from 3 to 5 contiguous ansa carbon atoms in a chain, one end of which is bonded to ($X^5$) and the other end of which is bonded to ($X^6$);

wherein ($X^7$), ($X^8$), any substituent on the substituted bridging group connecting ($X^5$) and ($X^6$), any substituent on ($X^5$), and any substituent on ($X^6$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

In still another aspect, the second metallocene compound can have the following formula:

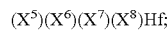

wherein ($X^5$) and ($X^6$) are independently selected from a monosubstituted cyclopentadienyl, a monosubstituted indenyl, a monosubstituted fluorenyl, or a monosubstituted, partially saturated analog thereof;

wherein each substituent on ($X^5$) and ($X^6$) is independently selected from a linear or branched aliphatic group, wherein the aliphatic group is unsubstituted or substituted, any one of which having from 1 to about 20 carbon atoms;

wherein ($X^7$), ($X^8$), and any substituent on the substituted aliphatic group on ($X^5$) and ($X^6$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

In one aspect of this invention, the chemically-treated solid oxide comprises a solid oxide treated with an electron-withdrawing anion, wherein the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof. In another aspect, the chemically-treated solid oxide can be selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof. Further, and in yet another aspect, the chemically-treated solid oxide can further comprise a metal or metal ion selected from zinc, nickel, vanadium, silver, copper, gallium, tin, tungsten, molybdenum, or any combination thereof.

Yet another aspect of this invention is a catalyst composition further comprising an optional cocatalyst selected from at least one aluminoxane, at least one organozinc compound, at least one organoboron compound, at least one ionizing ionic compound, or any combination thereof.

Still another aspect of this invention is a catalyst composition consisting essentially of a first metallocene compound, a second metallocene compound, at least one chemically-treated solid oxide, and at least one organoaluminum compound.

In another aspect, this invention provides a process to produce or prepare a catalyst composition comprising contacting a first metallocene compound, a second metallocene compound, at least one chemically-treated solid oxide, and at least one organoaluminum compound.

In still another aspect, this invention provides a process for polymerizing olefins in the presence of a catalyst composition, comprising contacting the catalyst composition with at least one type of olefin monomer, wherein the catalyst composition comprises a first metallocene compound, a second metallocene compound, at least one chemically-treated solid oxide, and at least one organoaluminum compound. Thus, this invention comprises methods for polymerizing olefins using the catalyst compositions prepared as described herein.

The present invention also encompasses new polyolefins and new films.

In one aspect, this invention provides a polymer or copolymer of ethylene wherein the resin is characterized by a melt index (MI) of from about 0.3 to about 2.0 g/10 min, determined using a 2.16 kg load at 190° C. In another aspect, the polymer resin of this invention is characterized by a high load melt index (HLMI) of from about 10 to about 30 g/10 min, determined with a 21.6 kg load at 190° C.

In another aspect, this invention provides a polymer or copolymer of ethylene wherein the resin is characterized by a density from about 0.94 to about 0.91 g/cm$^3$.

In still another aspect, this invention provides a polymer or copolymer of ethylene wherein the resin is characterized by a Carreau-Yasuda "a" breadth parameter (CY-a) from about 0.45 to about 0.70.

Another aspect of this invention is a polymer or copolymer of ethylene wherein the resin is characterized by a polydispersity (Mw/Mn) of from about 2 to about 6.

Yet a different aspect of this invention is a polymer or copolymer of ethylene wherein the resin is characterized by an Elmendorf MD tear resistance of greater than or equal to about 150 g/mil. In another aspect of the invention, a polymer or copolymer of ethylene is provided wherein the resin is characterized by an Elmendorf TD tear resistance of greater than or equal to about 300 g/mil.

Still a different aspect of this invention is a polymer of copolymer of ethylene wherein the Dart impact strength is greater than or equal to about 600 g/mil. In another aspect, a polymer or copolymer of ethylene is provided wherein the Spencer impact strength is greater than or equal to about 0.25 J/mil.

In yet another aspect, this invention provides a polymer or copolymer of ethylene wherein the resin is characterized by a haze of less than about 25%.

This invention also provides, in another aspect, an article that comprises the polymer produced with the catalyst composition of this invention.

These and other features, aspects, embodiments, and advantages of the present invention will become apparent after a review of the following detailed description of the disclosed features.

DETAILED DESCRIPTION OF THE INVENTION

The present invention provides new catalyst compositions, methods for preparing catalyst compositions, methods for using the catalyst compositions to polymerize olefins, and olefin polymers, copolymers, and polymer films. In the course of examining metallocene-based olefin polymerization catalysts, it was discovered that a dual metallocene catalyst system provided a useful combination of polyolefin properties, such as melt index, haze, MD tear, and the like, while maintaining sufficient melt strength so the resin is suitable for blowing film.

In one aspect, the present invention encompasses a composition of matter comprising a first metallocene compound, a second metallocene compound, at least one chemically-treated solid oxide, and at least one organoaluminum compound. In another aspect, this invention encompasses a catalyst composition, a catalyst composition for polymerizing olefins, a method of preparing a catalyst composition, a method of using a catalyst composition, and the like, in each case encompassing a first metallocene compound, a second metallocene compound, at least one chemically-treated solid oxide, and at least one organoaluminum compound. In another aspect, this invention comprises new polyolefins and films.

Catalyst Composition and Components

The Metallocene Compounds

In one aspect, the present invention provides a catalyst composition comprising a first metallocene compound, a second metallocene compound, at least one chemically-treated solid oxide, and at least one organoaluminum compound. Thus, in one aspect, for example, two different metallocene compounds are used simultaneously in a polymerization process to produce a polyethylene resin with good properties for linear low density (LLDPE) film applications.

In one aspect, for example, when a first metallocene compound is employed in a catalyst composition without a second metallocene compound, a polyethylene may be obtained with insufficient molecular weight, melt strength, and optical properties, for use in LLDPE film applications. Using a second metallocene compound which makes higher molecular weight polyethylene when used alone, in conjunction with the first metallocene compound, may provide improved film performance in such parameters as melt strength, activity, MD tear, and optical properties, as compared to a catalyst composition comprising either single metallocene compound without the other.

In one aspect of this invention, for example, the first metallocene is a zirconium metallocene compound wherein the two $\eta^5$-cycloalkadienyl ligands are typically monosubstituted with an aliphatic group. In another aspect, for example, the second metallocene may be different from the first by further substitution of the $\eta^5$-cycloalkadienyl rings, by being unbridged or loosely bridged, or by comprising the hafnium analog of the zirconium first metallocene. In another aspect, any combination of more than one second metallocene compound may be used in the catalyst compositions of this invention.

In one aspect, this invention encompasses a catalyst composition comprising a first metallocene compound, a second metallocene compound, at least one chemically-treated solid oxide, and at least one organoaluminum compound, wherein:

a) the first metallocene compound has the following formula:

$$(X^1)(X^2)(X^3)(X^4)Zr;$$

wherein $(X^1)$ and $(X^2)$ are independently selected from a monosubstituted cyclopentadienyl, a monosubstituted indenyl, a monosubstituted fluorenyl, or a monosubstituted, partially saturated analog thereof;

wherein each substituent on $(X^1)$ and $(X^2)$ is independently selected from a linear or branched aliphatic group, wherein the aliphatic group is unsubstituted or substituted, any one of which having from 1 to about 20 carbon atoms;

wherein $(X^3)$, $(X^4)$, and any substituent on the substituted aliphatic group on $(X^1)$ and $(X^2)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

b) wherein the second metallocene compound has the following formula:

$$(X^5)(X^6)(X^7)(X^8)M;\text{ wherein}$$

1) M is Zr;
   $(X^5)$ and $(X^6)$ are independently selected from a substituted cyclopentadienyl, a substituted indenyl, a substituted fluorenyl, or a substituted, partially saturated analog thereof, wherein at least one of $(X^5)$ and (X6) is at least disubstituted; and
   each substituent on $(X^5)$ and $(X^6)$ is independently selected from a linear or branched aliphatic group, wherein the aliphatic group is unsubstituted or substituted, any one of which having from 1 to about 20 carbon atoms;

2) M is Zr;
   $(X^5)$ and $(X^6)$ are independently selected from a cyclopentadienyl, an indenyl, a fluorenyl, a partially saturated analog thereof, or a substituted analog thereof; and
   $(X^5)$ and (X6) are connected by a substituted or unsubstituted bridging group comprising from 3 to 5 contiguous ansa carbon atoms in a chain, one end of which is bonded to $(X^5)$ and the other end of which is bonded to $(X^6)$; or 3) M is Hf;
   $(X^5)$ and $(X^6)$ are independently selected from a monosubstituted cyclopentadienyl, a monosubstituted indenyl, a monosubstituted fluorenyl, or a monosubstituted, partially saturated analog thereof; and
   each substituent on $(X^5)$ and $(X^6)$ is independently selected from a linear or branched aliphatic group, wherein the aliphatic group is unsubstituted or substituted, any one of which having from 1 to about 20 carbon atoms; and wherein $(X^7)$, (X8), any substituent on $(X^5)$, any substituent on $(X^6)$, any substituent on the substituted aliphatic group on $(X^5)$ and $(X^6)$, and any substituent on the substituted bridging group connecting $(X^5)$ and $(X^6)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen; and c) the chemically-treated solid oxide comprises a solid oxide treated with an electron-withdrawing anion.

In another aspect of this invention, the organoaluminum compound can have the following formula:

$$Al(X^9)_n(X^{10})_{3-n};$$

wherein $(X^9)$ is a hydrocarbyl having from 1 to about 20 carbon atoms; $(X^{10})$ is selected from alkoxide or aryloxide having from 1 to about 20 carbon atoms, halide, or hydride; and n is a number from 1 to 3, inclusive.

Catalyst compositions comprising various combinations of these metallocenes including, but not limited to, at least one first metallocene compound and at least one second metallocene compound, any combination of more than one first metallocene compound and any combination of more than one second metallocene compound, are also encompassed by this invention.

The First Metallocene Compound

In one aspect of this invention, the first metallocene compound has the following formula:

$$(X^1)(X^2)(X^3)(X^4)Zr;$$

wherein $(X^1)$ and $(X^2)$ are independently selected from a monosubstituted cyclopentadienyl, a monosubstituted indenyl, a monosubstituted fluorenyl, or a monosubstituted, partially saturated analog thereof;

wherein each substituent on $(X^1)$ and $(X^2)$ is independently selected from a linear or branched aliphatic group, wherein the aliphatic group is unsubstituted or substituted, any one of which having from 1 to about 20 carbon atoms; and wherein $(X^3)$, $(X^4)$, and any substituent on the substituted aliphatic group on $(X^1)$ and $(X^2)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

In another aspect, the first metallocene compound has the formula:

$$(\eta^5\text{-}C_5H_4R^1)_2ZrX^{11}{}_2,$$

wherein $R^1$ in each instance is independently selected from a linear or branched aliphatic group having from 1 to about 20 carbon atoms, and wherein $X^{11}$ in each instance is independently selected from F, Cl, Br, I, OMe, OEt, O-n-Pr, O-i-Pr, O-n-Bu, O-t-Bu, NMe$_2$, or NEt$_2$.

Still another aspect of this invention is a catalyst composition comprising a first metallocene compound having the formula $(\eta^5\text{-}C_5H_4R^1)_2ZrCl_2$, wherein $R^1$ in each instance is independently selected from a linear or branched aliphatic group having from 1 to about 20 carbon atoms.

In yet another aspect, the catalyst composition of this invention comprises a first metallocene compound selected from $(\eta^5\text{-}C_5H_4Me)_2ZrCl_2$, $(\eta^5\text{-}C_5H_4Et)_2ZrCl_2$, $(\eta^5\text{-}C_5H_4{}^nPr)_2ZrCl_2$, $(\eta^5\text{-}C_5H_4{}^iPr)_2ZrCl_2$, $(\eta^5\text{-}C_5H_4{}^nBu)_2ZrCl_2$, $(\eta^5\text{-}C_5H_4{}^iBu)_2ZrCl_2$, $(\eta^5\text{-}C_5H_4{}^sBu)_2ZrCl_2$, $(\eta^5\text{-}C_5H_4{}^tBu)_2ZrCl_2$, and the like.

Yet another aspect of this invention is the first metallocene compound having the formula $(\eta^5\text{-}C_5H_4''Bu)_2ZrCl_2$.

It is not necessary that both $\eta^5$-cyclopentadienyl-type ligands be the same in the first metallocene compound. Thus, the first metallocene compound can comprise any combination of two $\eta^5$-cyclopentadienyl-type ligands selected from a monosubstituted cyclopentadienyl, a monosubstituted indenyl, a monosubstituted fluorenyl, or a monosubstituted, partially saturated analog thereof. The term partially saturated analog refers to ligands such as partially saturated indenyls and fluorenyls including, but not limited to, tetrahydroindenyls, tetrahydrofluorenyls, and octahydrofluorenyls. Thus, the first metallocene compound can comprise a monosubstituted tetrahydroindenyl, a monosubstituted tetrahydrofluorenyl, or a monosubstituted octahydrofluorenyl.

Further, it is not necessary that both $\eta^5$-cyclopentadienyl-type ligands be monosubstituted with the same aliphatic group, even when the $\eta^5$-cyclopentadienyl-type ligands both are monosubstituted cyclopentadienyl, both are monosubstituted indenyl, both are monosubstituted fluorenyl, and the like. Thus, even when $(X^1)$ and $(X^2)$ of the first metallocene compound $(X^1)(X^2)(X^3)(X^4)Zr$ are both monosubstituted cyclopentadienyl, it is not necessary that the aliphatic group substituents be the same. In this aspect, for example, $(\eta^5\text{-}C_5H_4''Bu)_2ZrCl_2$ and $(\eta^5\text{-}C_5H_4''Bu)(\eta^5\text{-}C_5H_4Me)ZrCl_2$ constitute examples of a compound that may be used as a first metallocene compound.

The Second Metallocene Compound

In one aspect of this invention, the second metallocene compound has the following formula:

$(X^5)(X^6)(X^7)(X^8)M$; wherein

1) M is Zr;
   $(X^5)$ and (X6) are independently selected from a substituted cyclopentadienyl, a substituted indenyl, a substituted fluorenyl, or a substituted, partially saturated analog thereof, wherein at least one of $(X^5)$ and $(X^6)$ is at least disubstituted; and
   each substituent on $(X^5)$ and $(X^6)$ is independently selected from a linear or branched aliphatic group, wherein the aliphatic group is unsubstituted or substituted, any one of which having from 1 to about 20 carbon atoms;

2) M is Zr;
   $(X^5)$ and $(X^6)$ are independently selected from a cyclopentadienyl, an indenyl, a fluorenyl, a partially saturated analog thereof, or a substituted analog thereof; and
   $(X^5)$ and $(X^6)$ are connected by a substituted or unsubstituted bridging group comprising from 3 to 5 contiguous ansa carbon atoms in a chain, one end of which is bonded to $(X^5)$ and the other end of which is bonded to $(X^6)$; or 3) M is Hf;
   $(X^5)$ and $(X^6)$ are independently selected from a monosubstituted cyclopentadienyl, a monosubstituted indenyl, a monosubstituted fluorenyl, or a monosubstituted, partially saturated analog thereof; and
   each substituent on $(X^5)$ and $(X^6)$ is independently selected from a linear or branched aliphatic group, wherein the aliphatic group is unsubstituted or substituted, any one of which having from 1 to about 20 carbon atoms; and
   wherein $(X^7)$, $(X^8)$, any substituent on $(X^5)$, any substituent on $(X^6)$, any substituent on the substituted aliphatic group on $(X^5)$ and $(X^6)$, and any substituent on the substituted bridging group connecting $(X^5)$ and $(X^6)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

Type I Second Metallocene Compound

In one aspect of this invention, the second metallocene compound can have the following formula:

$(X^5)(X^6)(X^7)(X^8)Zr$;

wherein $(X^5)$ and $(X^6)$ are independently selected from a substituted cyclopentadienyl, a substituted indenyl, a substituted fluorenyl, or a substituted, partially saturated analog thereof, wherein at least one of $(X^5)$ and $(X^6)$ is at least disubstituted;

wherein each substituent on $(X^5)$ and $(X^6)$ is independently selected from a linear or branched aliphatic group, wherein the aliphatic group is unsubstituted or substituted, any one of which having from 1 to about 20 carbon atoms;

wherein $(X^7)$, $(X^8)$, and any substituent on the substituted aliphatic group on $(X^5)$ and $(X^6)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen. In another aspect, when the second metallocene compound has this formula, both $(X^5)$ and $(X^6)$ may be at least disubstituted.

In this aspect of the invention, the second metallocene compound comprises a more highly substituted zirconium metallocene compound than the first metallocene compound, in which the $\eta^5$-cyclopentadienyl-type ligands are monosubstituted. Thus, in this aspect of the invention, the $\eta^5$-cyclopentadienyl-type ligands of the second metallocene compound may be disubstituted, trisubstituted, tetrasubstituted, or pentasubstituted. In another aspect, the $\eta^5$-cyclopentadienyl-type ligands of the second metallocene compound may be disubstituted or trisubstituted.

In still another aspect, the second metallocene compound can have the formula $(\eta^5\text{-}C_5H_3R^1{}_2)_2ZrX^{11}{}_2$, wherein $R^1$ in each instance is independently selected from a linear or branched aliphatic group having from 1 to about 20 carbon atoms, and $X^{11}$ in each instance is independently selected from F, Cl, Br, I, OMe, OEt, O-n-Pr, O-i-Pr, O-n-Bu, O-t-Bu, NMe$_2$, or NEt$_2$.

In another aspect, the second metallocene compound can have the formula $(\eta^5\text{-}C_5H_3''BuR^2)_2ZrCl_2$, wherein $R^2$ is selected from Me, Et, n-Pr, i-Pr, n-Bu, s-Bu, i-Bu, or t-Bu.

Yet another aspect of this invention is a catalyst composition comprising a second metallocene compound of the formula $(\eta^5\text{-}C_5H_3''BuMe)_2ZrCl_2$.

Type II Second Metallocene Compound

In yet another aspect, the second metallocene compound can be an ansa-metallocene having the following formula:

$(X^5)(X^6)(X^7)(X^8)Zr$;

wherein $(X^5)$ and $(X^6)$ are independently selected from a cyclopentadienyl, an indenyl, a fluorenyl, a partially saturated analog thereof, or a substituted analog thereof;

wherein $(X^5)$ and $(X^6)$ are connected by a substituted or unsubstituted bridging group comprising from 3 to 5 contiguous ansa carbon atoms in a chain, one end of which is bonded to $(X^5)$ and the other end of which is bonded to $(X^6)$;

wherein $(X^7)$, $(X^8)$, any substituent on the substituted bridging group connecting $(X^5)$ and $(X^6)$, any substituent on $(X^5)$, and any substituent on $(X^6)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

As used herein, the term ansa-metallocene refers simply to a metallocene compound in which the two $\eta^5$-cycloalkadienyl-type ligands in the molecule are linked by a bridging moiety. Useful ansa-metallocenes are typically "loosely-bridged", meaning that the two $\eta^5$-cycloalkadienyl-type ligands are connected by a bridging group wherein the shortest link of the bridging moiety between the $\eta^5$-cycloalkadienyl-type ligands is at least 3 atoms and up to about 5 atoms. Thus, the length of the bridge or the chain between the two $\eta^5$-cycloalkadienyl-type ligands is from 3 to about 5 atoms. Further, the bridge that connects the two $\eta^5$-cycloalkadienyl-type ligands may be substituted or unsubstituted.

In one aspect, the second metallocene compound may be selected from $[\mu\text{-CH}_2(\text{CH}_2)_n\text{CH}_2](\eta^5\text{-9-C}_{13}\text{H}_8)_2\text{ZrX}^{12}_2$, $[\mu\text{-CH}_2(\text{CH}_2)_n\text{CH}_2](\eta^5\text{-9-C}_{13}\text{H}_{16})_2\text{ZrX}^{12}_2$, $[\mu\text{-CH}_2(\text{CH}_2)_n\text{CH}_2](\eta^5\text{-1-C}_9\text{H}_6)_2\text{ZrX}^{12}_2$, $[\mu\text{-CH}_2(\text{CH}_2)_n\text{CH}_2](\eta^5\text{-1-C}_9\text{H}_{10})_2\text{ZrX}^{12}_2$, or any combination thereof, wherein n is from 1 to 3, and wherein $X^{12}$, in each occurrence, is independently selected from an aliphatic group, an aromatic group, an alkoxide group, an aryloxide group, an alkylamide group, an arylamide group, a dialkylamide group, a diarylamide group, an alkyl arylamide group, an alkylthiolate group, an arylthiolate group, or a substituted derivative thereof, any one of which having from 1 to about 20 carbon atoms; a halide; or hydrogen.

In another aspect, the present invention encompasses a catalyst composition comprising a second metallocene compound selected from $[\mu\text{-CH}_2(\text{CH}_2)_n\text{CH}_2](\eta^5\text{-9-C}_{13}\text{H}_8)_2\text{ZrX}^{12}_2$, $[\mu\text{-CH}_2(\text{CH}_2)_n\text{CH}_2](\eta^5\text{-9-C}_{13}\text{H}_{16})_2\text{ZrX}^{12}_2$, $[\mu\text{-CH}_2(\text{CH}_2)_n\text{CH}_2](\eta^5\text{-1-C}_9\text{H}_6)_2\text{ZrX}^{12}_2$, $[\mu\text{-CH}_2(\text{CH}_2)_n\text{CH}_2](\eta^5\text{-1-C}_9\text{H}_{10})_2\text{ZrX}^{12}_2$, or any combination thereof, wherein n is from 1 to 3, and wherein $X^{12}$ is independently selected from F, Cl, Br, I, OMe, OEt, O-n-Pr, O-i-Pr, O-n-Bu, O-t-Bu, NMe$_2$, or NEt$_2$.

Still another aspect of this invention, for example, is a second metallocene compound selected from:

1,3-propanediylbis($\eta^5$-9-fluorenyl)zirconium dichloride;
1,4-butanediylbis($\eta^5$-9-fluorenyl)zirconium dichloride;
1,5-pentanediylbis($\eta^5$-9-fluorenyl)zirconium dichloride;
1,3-propanediylbis($\eta^5$-1-indenyl)zirconium dichloride;
1,4-butanediylbis($\eta^5$-1-indenyl)zirconium dichloride;
1,5-pentanediylbis($\eta^5$-1-indenyl)zirconium dichloride;
1,3-propanediylbis($\eta^5$-9-fluorenyl)di-n-butoxyzirconium;
1,4-butanediylbis($\eta^5$-9-fluorenyl)di-n-butoxyzirconium;
1,5-pentanediylbis($\eta^5$-9-fluorenyl)di-n-butoxyzirconium;
1,3-propanediylbis($\eta^5$-1-indenyl)di-n-butoxyzirconium;
1,4-butanediylbis($\eta^5$-1-indenyl)di-n-butoxyzirconium;
1,5-pentanediylbis($\eta^5$-1-indenyl)di-n-butoxyzirconium;
1,3-propanediylbis($\eta^5$-9-fluorenyl)zirconium dimethyl;
1,4-butanediylbis($\eta^5$-9-fluorenyl)zirconium dimethyl;
1,5-pentanediylbis($\eta^5$-9-fluorenyl)zirconium dimethyl;
1,3-propanediylbis($\eta^5$-1-indenyl)zirconium dimethyl;
1,4-butanediylbis($\eta^5$-1-indenyl)zirconium dimethyl;
1,5-pentanediylbis($\eta^5$-1-indenyl)zirconium dimethyl;

or any combination thereof.

Type III Second Metallocene Compound

In still another aspect, the second metallocene compound can have the following formula:

$$(X^5)(X^6)(X^7)(X^8)\text{Hf};$$

wherein $(X^5)$ and $(X^6)$ are independently selected from a monosubstituted cyclopentadienyl, a monosubstituted indenyl, a monosubstituted fluorenyl, or a monosubstituted, partially saturated analog thereof;

wherein each substituent on $(X^5)$ and $(X^6)$ is independently selected from a linear or branched aliphatic group, wherein the aliphatic group is unsubstituted or substituted, any one of which having from 1 to about 20 carbon atoms; and wherein $(X^7)$, $(X^8)$, and any substituent on the substituted aliphatic group on $(X^5)$ and $(X^6)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

In this aspect, the second metallocene compound is the hafnium analog of the first metallocene zirconium compound.

In another aspect, the second metallocene compound has the following formula:

$$(\eta^5\text{-C}_5\text{H}_4\text{R}^1)_2\text{HfX}^{11}_2,$$

wherein $R^1$ in each instance is independently selected from a linear or branched aliphatic group having from 1 to about 20 carbon atoms, and $X^{11}$ is independently selected from F, Cl, Br, I, OMe, OEt, O-n-Pr, O-i-Pr, O-n-Bu, O-t-Bu, NMe$_2$, or NEt$_2$;

Still another aspect of this invention is a catalyst composition comprising a second metallocene compound having the formula $(\eta^5\text{-C}_5\text{H}_4\text{R}^1)_2\text{HfCl}_2$, wherein $R^1$ in each instance is independently selected from a linear or branched aliphatic group having from 1 to about 20 carbon atoms.

In yet another aspect, for example, the catalyst composition of this invention comprises a second metallocene compound selected from $(\eta^5\text{-C}_5\text{H}_4\text{Me})_2\text{HfCl}_2$, $(\eta^5\text{-C}_5\text{H}_4\text{Et})_2\text{HfCl}_2$, $(\eta^5\text{-C}_5\text{H}_4{}^n\text{Pr})_2\text{HfCl}_2$, $(\eta^5\text{-C}_5\text{H}_4{}^i\text{Pr})_2\text{HfCl}_2$, $(\eta^5\text{-C}_5\text{H}_4{}^n\text{BU})_2\text{HfCl}_2$, $(\eta^5\text{-C}_5\text{H}_4{}^i\text{Bu})_2\text{HfCl}_2$, $(\eta^5\text{-C}_5\text{H}_4{}^s\text{Bu})_2\text{HfCl}_2$, $(\eta^5\text{-C}_5\text{H}_4{}^t\text{Bu})_2\text{HfCl}_2$, and the like.

Yet another aspect of this invention, for example, is the second metallocene compound having the formula $(\eta^5\text{-C}_5\text{H}_4{}^n\text{Bu})_2\text{HfCl}_2$.

It is not necessary that both $\eta^5$-cyclopentadienyl-type ligands be the same in this type of second metallocene compound. Thus, this type of second metallocene compound can comprise any combination of two $\eta^5$-cyclopentadienyl-type ligands selected from a monosubstituted cyclopentadienyl, a monosubstituted indenyl, a monosubstituted fluorenyl, or a monosubstituted, partially saturated analog thereof. The term partially saturated analog refers to ligands such as partially saturated indenyls and fluorenyls including, but not limited to, tetrahydroindenyls, tetrahydrofluorenyls, and octahydrofluorenyls. Thus, the first metallocene compound can comprise a monosubstituted tetrahydroindenyl, a monosubstituted tetrahydrofluorenyl, or a monosubstituted octahydrofluorenyl.

Further, it is not necessary that both $\eta^5$-cyclopentadienyl-type ligands be monosubstituted with the same aliphatic group, even when the $\eta^5$-cyclopentadienyl-type ligands both are monosubstituted cyclopentadienyl, both are monosubstituted indenyl, both are monosubstituted fluorenyl, and the like. Thus, even when ($X^5$) and ($X^6$) of the second metallocene compound ($X^5$)($X^6$)($X^7$)($X^8$)Hf are both monosubstituted cyclopentadienyl, it is not necessary that the aliphatic group substituents be the same. In this aspect, for example, ($\eta^5$-$C_5H_4$"Bu)$_2$HfCl$_2$ and ($\eta^5$-$C_5H_4$"Bu)($\eta^5$-$C_5H_4$Me)HfCl$_2$ constitute examples of a compound that may be used as a second metallocene compound.

Substituents

In one aspect of this invention, the metallocene compounds can comprise a variety of substituents, comprising chemical moieties bonded either to the metal itself as an ($X^3$), ($X^4$), ($X^7$), or ($X^8$) ligand, or bonded to another portion of the molecule, such as a substituent on an aliphatic moiety bonded to a $\eta^5$-cyclopentadienyl-type ligand, a substituent on a bridging group linking two a $\eta^5$-cyclopentadienyl-type ligand, or the like.

In this aspect, for example, ($X^3$); ($X^4$); ($X^7$); ($X^8$); any substituent on the substituted aliphatic group on ($X^1$), ($X^2$), ($X^5$), and ($X^6$); any substituent on ($X^5$) and ($X^6$); and any substituent on the substituted bridging group connecting ($X^5$) and ($X^6$); are typically independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen; as long as these groups do not terminate the activity of the catalyst composition. Further, this description can include substituted, unsubstituted, branched, linear, or heteroatom-substituted analogs of these moieties.

Further, this list of possible substituents includes substituents that may be characterized in more than one of these categories such as benzyl. This list also includes hydrogen, therefore the notion of a substituted indenyl and substituted fluorenyl includes partially saturated indenyls and fluorenyls including, but not limited to, tetrahydroindenyls, tetrahydrofluorenyls, and octahydrofluorenyls.

Examples of each of these substituent groups include, but are not limited to, the following groups. In each example presented below, unless otherwise specified, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 20 carbon atoms; or hydrogen. Also included in these groups are any unsubstituted, branched, or linear analogs thereof.

Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having from one to about 20 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of aromatic groups, in each instance, include, but are not limited to, phenyl, naphthyl, anthacenyl, and the like, including substituted derivatives thereof, in each instance having from 6 to about 25 carbons. Substituted derivatives of aromatic compounds include, but are not limited to, tolyl, xylyl, mesityl, and the like, including any heteroatom substituted derivative thereof.

Examples of cyclic groups, in each instance, include, but are not limited to, cycloparaffins, cycloolefins, cycloacetylenes, arenes such as phenyl, bicyclic groups and the like, including substituted derivatives thereof, in each instance having from about 3 to about 20 carbon atoms. Thus heteroatom-substituted cyclic groups such as furanyl are included herein.

In each instance, aliphatic and cyclic groups are groups comprising an aliphatic portion and a cyclic portion, examples of which include, but are not limited to, groups such as: —$(CH_2)_mC_6H_qR_{5-q}$ wherein m is an integer from 1 to about 10, q is an integer from 1 to 5, inclusive; —$(CH_2)_m$ $C_6H_qR_{11-q}$ wherein m is an integer from 1 to about 10, q is an integer from 1 to 11, inclusive; and —$(CH_2)_mC_5H_qR_{9-q}$, wherein m is an integer from 1 to about 10, q is an integer from 1 to 9, inclusive. In each instance and as defined above, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 20 carbon atoms; or hydrogen. In one aspect, aliphatic and cyclic groups include, but are not limited to: —$CH_2C_6H_5$; —$CH_2C_6H_4F$; —$CH_2C_6H_4Cl$; —$CH_2C_6H_4Br$; —$CH_2C_6H_4I$; —$CH_2C_6H_4OMe$; —$CH_2C_6H_4OEt$; —$CH_2C_6H_4NH_2$; —$CH_2C_6H_4NMe_2$; —$CH_2C_6H_4NEt_2$; —$CH_2CH_2C_6H_5$; —$CH_2CH_2C_6H_4F$; —$CH_2CH_2C_6H4Cl$; —$CH_2CH_2C_6H_4Br$; —$CH_2CH_2C_6H_4I$; —$CH_2CH_2C_6H_4OMe$; —$CH_2CH_2C_6H_4OEt$; —$CH_2CH_2C_6H_4NH_2$; —$CH_2CH_2C_6H_4NMe_2$; —$CH_2CH_2C_6H_4NEt_2$; any regioisomer thereof, and any substituted derivative thereof.

Examples of halides, in each instance, include fluoride, chloride, bromide, and iodide.

In each instance, oxygen groups are oxygen-containing groups, examples of which include, but are not limited to, alkoxy or aryloxy groups (—OR), —OC(O)R, —OC(O)H, —$OSiR_3$, —$OPR_2$, —$OAlR_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

In each instance, sulfur groups are sulfur-containing groups, examples of which include, but are not limited to, —SR, —$OSO_2R$, —$OSO_2OR$, —SCN, —$SO_2R$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, nitrogen groups are nitrogen-containing groups, which include, but are not limited to, —$NH_2$, —NHR, —$NR_2$, —$NO_2$, —$N_3$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, phosphorus groups are phosphorus-containing groups, which include, but are not limited to, —$PH_2$, —PHR, —$PR_2$, —$P(O)R_2$, —$P(OR)_2$, —$P(O)(OR)_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, arsenic groups are arsenic-containing groups, which include, but are not limited to, —AsHR, —AsR$_2$, —As(O)R$_2$, —As(OR)$_2$, —As(O)(OR)$_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, carbon groups are carbon-containing groups, which include, but are not limited to, alkyl halide groups that comprise halide-substituted alkyl groups with 1 to about 20 carbon atoms, aralkyl groups with 1 to about 20 carbon atoms, —C(O)H, —C(O)R, —C(O)OR, cyano, —C(NR)H, —C(NR)R, —C(NR)OR, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, silicon groups are silicon-containing groups, which include, but are not limited to, silyl groups such alkylsilyl groups, arylsilyl groups, arylalkylsilyl groups, siloxy groups, and the like, which in each instance have from 1 to about 20 carbon atoms. For example, silicon groups include trimethylsilyl and phenyloctylsilyl groups.

In each instance, germanium groups are germanium-containing groups, which include, but are not limited to, germyl groups such alkylgermyl groups, arylgermyl groups, arylalkylgermyl groups, germyloxy groups, and the like, which in each instance have from 1 to about 20 carbon atoms.

In each instance, tin groups are tin-containing groups, which include, but are not limited to, stannyl groups such alkylstannyl groups, arylstannyl groups, arylalkylstannyl groups, stannoxy (or "stannyloxy") groups, and the like, which in each instance have from 1 to about 20 carbon atoms. Thus, tin groups include, but are not limited to, stannoxy groups.

In each instance, lead groups are lead-containing groups, which include, but are not limited to, alkyllead groups, aryllead groups, arylalkyllead groups, and the like, which in each instance, have from 1 to about 20 carbon atoms.

In each instance, boron groups are boron-containing groups, which include, but are not limited to, —BR$_2$, —BX$_2$, —BRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

In each instance, aluminum groups are aluminum-containing groups, which include, but are not limited to, —AlR$_2$, —AlX$_2$, —AlRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

Examples of inorganic groups that may be used as substituents for substituted cyclopentadienyls, substituted indenyls, substituted fluorenyls, and substituted boratabenzenes, in each instance, include, but are not limited to, —SO$_2$X, —OAlX$_2$, —OSiX$_3$, —OPX$_2$, —SX, —OSO$_2$X, —AsX$_2$, —As(O)X$_2$, —PX$_2$, and the like, wherein X is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to about 20 carbon atoms.

Examples of organometallic groups that may be used as substituents for substituted cyclopentadienyls, substituted indenyls, and substituted fluorenyls, in each instance, include, but are not limited to, organoboron groups, organoaluminum groups, organogallium groups, organosilicon groups, organogermanium groups, organotin groups, organolead groups, organo-transition metal groups, and the like, having from 1 to about 20 carbon atoms.

Numerous processes to prepare metallocene compounds that can be employed in this invention have been reported. For example, U.S. Pat. Nos. 4,939,217, 5,191,132, 5,210,352, 5,347,026, 5,399,636, 5,401,817, 5,420,320, 5,436,305, 5,451,649, 5,480,848, 5,496,781, 5,498,581, 5,541,272, 5,554,795, 5,563,284, 5,565,592, 5,571,880, 5,594,078, 5,631,203, 5,631,335, 5,654,454, 5,668,230, , 5,705,579, and 6,509,427 describe such methods, each of which is incorporated by reference herein, in its entirety. In addition, the following treatises also describe methods to prepare the metallocene compounds of the present invention: Wailes, P. C.; Coutts, R. S. P.; Weigold, H. in Organometallic Chemistry of Titanium, Zironium, and Hafnium, Academic; New York, 1974.; Cardin, D. J.; Lappert, M. F.; and Rastan, C. L.; Chemistry of Organo-Zirconium and -Hafnium Compounds; Halstead Press; New York, 1986.

The Chemically Treated Solid Oxide

In one aspect, this invention encompasses a catalyst composition comprising a first metallocene compound, a second metallocene compound, at least one chemically-treated solid oxide, and at least one organoaluminum compound. In another aspect, the present invention encompasses catalyst compositions comprising a chemically-treated solid oxide which serves as an acidic activator-support, and which is typically used in combination with an organoaluminum compound.

In one aspect of this invention, the catalyst composition can comprise at least one chemically-treated solid oxide comprising at least one solid oxide treated with at least one electron-withdrawing anion, wherein the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

In another aspect of this invention, the catalyst composition comprises a chemically-treated solid oxide comprising a solid oxide treated with an electron-withdrawing anion, wherein:

the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, fluorophosphate, fluorosulfate, or any combination thereof. In another aspect, for example, the chemically-treated solid oxide can be selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof. Further, and in yet another aspect, the chemically-treated solid oxide can further comprise a metal or metal ion selected from zinc, nickel, vanadium, silver, copper, gallium, tin, tungsten, molybdenum, or any combination thereof.

The chemically-treated solid oxide typically comprises the contact product of at least one solid oxide compound and at least one electron-withdrawing anion source. In one aspect, the solid oxide compound comprises an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

The chemically-treated solid oxide, also termed the activator-support, exhibits enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of cocatalysts, it is not necessary to eliminate cocatalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron compounds, or ionizing ionic compounds.

In one aspect, the chemically-treated solid oxide of this invention comprises a solid inorganic oxide material, a mixed oxide material, or a combination of inorganic oxide materials, that is chemically-treated with an electron-withdrawing component, and optionally treated with a metal. Thus, the solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound, and are encompassed by this invention.

In one aspect of this invention, the chemically-treated solid oxide further comprises a metal or metal ion selected from zinc, nickel, vanadium, titanium, silver, copper, gallium, tin, tungsten, molybdenum, or any combination thereof. Examples of chemically-treated solid oxides that further comprise a metal or metal ion include, but are not limited to, zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, or any combination thereof.

In another aspect, the chemically-treated solid oxide of this invention comprises a solid oxide of relatively high porosity, which exhibits Lewis acidic or Brønsted acidic behavior. The solid oxide is chemically-treated with an electron-withdrawing component, typically an electron-withdrawing anion, to form an activator-support. While not intending to be bound by the following statement, it is believed that treatment of the inorganic oxide with an electron-withdrawing component augments or enhances the acidity of the oxide. Thus in one aspect, the activator-support exhibits Lewis or Brønsted acidity which is typically greater than the Lewis or Brønsted acid strength than the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) In another aspect, for example, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof Examples of mixed oxides that can be used in the activator-support of the present invention include, but are not limited to, silica-alumina, silica-titania, silica-zirconia, zeolites, many clay minerals, alumina-titania, alumina-zirconia, zinc-aluminate and the like.

In one aspect of this invention, the solid oxide material is chemically-treated by contacting it with at least one electron-withdrawing component, typically an electron-withdrawing anion source. Further, the solid oxide material is optionally chemically-treated with a metal ion, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. In one aspect, for example, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions may also be employed in the present invention.

When the electron-withdrawing component comprises a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components may be contacted with the oxide material simultaneously or individually, and any order that affords the desired chemically-treated solid oxide acidity. For example, one aspect of this invention is employing two or more electron-withdrawing anion source compounds in two or more separate contacting steps. Thus, one example of such a process by which an chemically-treated solid oxide is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the invention, the solid oxide activator-support (chemically-treated solid oxide) may be produced by a process comprising:

1) contacting a solid oxide compound with at least one electron-withdrawing anion source compound to form a first mixture; and 2) calcining the first mixture to form the solid oxide activator-support.

In another aspect of this invention, the solid oxide activator-support (chemically-treated solid oxide) is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide compound.

Another aspect of this invention is producing or forming the chemically-treated solid oxide by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoborates.

In one aspect of this invention, once the solid oxide has been treated and dried, it may be subsequently calcined. Calcining of the treated solid oxide is generally conducted in an ambient atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, calcining may be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the invention, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g. In still another aspect, the solid oxide component has a surface area from about 100 to about 1000 $m^2/g$. In another aspect, solid oxide component has a surface area from about 200 to about 800 $m^2/g$, and in still another aspect, from about 250 to about 600 $m^2/g$.

The solid oxide material may be treated with a source of halide ion or sulfate ion, or a combination of anions, and optionally treated with a metal ion, then calcined to provide the chemically-treated solid oxide in the form of a particulate solid. In one aspect, the solid oxide material is treated with a source of sulfate, termed a sulfating agent, a source of chloride ion, termed a chloriding agent, a source of fluoride ion, termed a fluoriding agent, or a combination thereof, and calcined to provide the solid oxide activator. In another aspect, useful acidic activator-supports include, but are not limited to: bromided alumina; chlorided alumina; fluorided alumina; sulfated alumina; bromided silica-alumina, chlorided silica-alumina; fluorided silica-alumina; sulfated silica-alumina; bromided silica-zirconia, chlorided silica-zirconia; fluorided silica-zirconia; sulfated silica-zirconia; a pillared clay such as a pillared montmorillonite, optionally treated with fluoride, chloride, or sulfate; phosphated alumina, or other aluminophosphates, optionally treated with sulfate, fluoride, or chloride; or any combination thereof. Further, any of the activator-supports may optionally be treated with a metal ion.

In one aspect of this invention, the chemically-treated solid oxide comprises a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), analogs thereof, and combinations thereof. For example, ammonium bifluoride $NH_4HF_2$ may be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide can comprise a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic chloriding agents may be used. Examples of volatile organic chloriding agents useful in this aspect of the invention include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcination. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina, before calcining. In another aspect, the amount of fluoride or chloride ion present before calcining the solid oxide is from about 3 to about 25% by weight, and in another aspect, from about 4 to about 20% by weight. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have a pore volume greater than about 0.5 cc/g. In one aspect, the pore volume may be greater than about 0.8 cc/g, and in another aspect, the pore volume may be greater than about 1.0 cc/g. Further, the silica-alumina may have a surface area greater than about 100 $m^2/g$. In one aspect, the surface area is greater than about 250 $m^2/g$, and in another aspect, the surface area may be greater than about 350 $m^2/g$. Generally, the silica-alumina of this invention has an alumina content from about 5 to about 95%. In one aspect, the alumina content of the silica-alumina may be from about 5 to about 50%, and in another aspect, the alumina content of the silica-alumina may be from about 8% to about 30% alumina by weight. In yet another aspect, the solid oxide component can comprise alumina without silica and in another aspect, the solid oxide component can comprise silica without alumina.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, for example selected from, but not limited to, sulfuric acid or a sulfate salt such as ammonium sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

In one aspect of the invention, the amount of sulfate ion present before calcining is generally from about 0.5 parts by weight to about 100 parts by weight sulfate ion to about 100 parts by weight solid oxide. In another aspect, the amount of sulfate ion present before calcining is generally from about 1 part by weight to about 50 parts by weight sulfate ion to about 100 parts by weight solid oxide, and in still another aspect, from about 5 parts by weight to about 30 parts by weight sulfate ion to about 100 parts by weight solid oxide. These weight ratios are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

In addition to being treated with an electron-withdrawing component such as halide or sulfate ion, the solid inorganic oxide of this invention may optionally be treated with a metal source, including metal salts or metal-containing compounds. In one aspect of the invention, these compounds may be added to or impregnated onto the solid oxide in solution form, and subsequently converted into the supported metal upon calcining. Accordingly, in one aspect, the solid inorganic oxide can further comprise a metal selected from zinc, titanium, nickel, vanadium, silver, copper, gallium, tin, tungsten, molybdenum, or a combination thereof. For example, zinc may be used to impregnate the solid oxide because it provides good catalyst activity and low cost. The solid oxide may be treated with metal salts or metal-containing compounds before, after, or at the same time that the solid oxide is treated with the electron-withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In another aspect, the first metallocene compound, the second metallocene compound, or a combination thereof, may be precontacted with an olefin monomer and an organoaluminum compound for a first period of time prior to contacting this mixture with the chemically-treated solid oxide. Once the precontacted mixture of the first metallocene compound, the second metallocene compound, or a combination thereof, olefin monomer, organoaluminum compound is contacted with the chemically-treated solid oxide, the composition further comprising the chemically-treated solid oxide is termed the "postcontacted" mixture. The postcontacted mixture may be allowed to remain in further contact for a second period of time prior to being charged into the reactor in which the polymerization process will be carried out.

Various processes to prepare solid oxide activator-supports that can be employed in this invention have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

The Organoaluminum Compound

In one aspect, this invention encompasses a catalyst composition comprising a first metallocene compound, a second metallocene compound, at least one chemically-treated solid oxide, and at least one organoaluminum compound. In this aspect, for example, organoaluminum compounds that can be used in this invention include, but are not limited to compound with the formula:

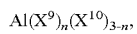

wherein $(X^9)$ is a hydrocarbyl having from 1 to about 20 carbon atoms; $(X^{10})$ is selected from alkoxide or aryloxide, any one of which having from 1 to about 20 carbon atoms, halide, or hydride; and n is a number from 1 to 3, inclusive. In one aspect, $(X^9)$ is an alkyl having from 1 to about 10 carbon atoms. Examples of $(X^9)$ moieties include, but are not limited to, ethyl, propyl, n-butyl, sec-butyl, isobutyl, hexyl, and the like. In another aspect, $(X^{10})$ may be independently selected from fluoro or chloro. In yet another aspect, $(X^{10})$ may be chloro.

In the formula $Al(X^9)_n(X^{10})_{3-n}$, n is a number from 1 to 3 inclusive, and typically, n is 3. The value of n is not restricted to be an integer, therefore this formula includes sesquihalide compounds or other organoaluminum cluster compounds.

In another aspect, examples of organoaluminum compounds that can be used in this invention include, but are not limited to, trialkylaluminum compounds, dialkylaluminium halide compounds, dialkylaluminum alkoxide compounds, dialkylaluminum hydride compounds, and combinations thereof. Specific examples of organoaluminum compounds that are useful in this invention include, but are not limited to: trimethylaluminum (TMA); triethylaluminum (TEA); tripropylaluminum; diethylaluminum ethoxide; tributylaluminum; disobutylaluminum hydride; triisobutylaluminum; and diethylaluminum chloride.

In one aspect, the present invention comprises precontacting the ansa-metallocene with at least one organoaluminum compound and an olefin monomer to form a precontacted mixture, prior to contact this precontacted mixture with the solid oxide activator-support to form the active catalyst. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator. However, all the organoaluminum compound may be used to prepare the catalyst in either the precontacting or postcontacting step. Alternatively, all the catalyst components may be contacted in a single step.

Further, more than one organoaluminum compounds may be used, in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. In another aspect, tri-ethylaluminum (TEA) or triisobutylaluminum are typical organoaluminum compounds used in this invention.

The Optional Aluminoxane Cocatalyst

In one aspect, this invention encompasses a catalyst composition comprising a first metallocene compound, a second metallocene compound, at least one chemically-treated solid oxide, and at least one organoaluminum compound. In another aspect, the present invention provides a catalyst composition comprising an optional aluminoxane cocatalyst in addition to these other components.

Aluminoxanes are also referred to as poly(hydrocarbyl aluminum oxides) or organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound of this invention is an oligomeric aluminum compound, wherein the aluminoxane compound can comprise linear structures, cyclic, or cage structures, or typically mixtures of all three. Cyclic aluminoxane compounds having the formula:

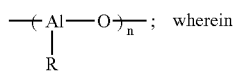

R is a linear or branched alkyl having from 1 to 10 carbon atoms, and n is an integer from 3 to about 10 are encompassed by this invention. The $(AlRO)_n$ moiety shown here also constitutes the repeating unit in a linear aluminoxane. Thus, linear aluminoxanes having the formula:

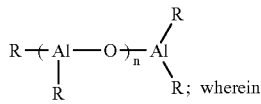

R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes that can serve as optional cocatalysts in this invention are generally represented by formulas such as $(R-Al-O)_n$, $R(R-Al-O)_nAlR_2$, and the like, wherein the R group is typically a linear or branched $C_1$-$C_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentyl-aluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas $(R—Al—O)_n$ and $R(R—Al—O)_n AlR_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the alumixoane to the metallocene in the composition is usually from about 1:10 to about 100,000:1. In one another aspect, the molar ratio of the aluminum in the alumixoane to the metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to about 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R—Al—O)_n$ aluminoxane species, both of which are encompassed by this invention. Alternatively, organoaluminoxanes may be prepared by reacting an aluminum alkyl compound such as $AlR_3$ with a hydrated salt, such as hydrated copper sulfate, in an inert organic solvent.

The Optional Organoboron Cocatalyst

In one aspect, this invention encompasses a catalyst composition comprising a first metallocene compound, a second metallocene compound, at least one chemically-treated solid oxide, and at least one organoaluminum compound. In another aspect, the present invention provides a catalyst composition comprising an optional organoboron cocatalyst in addition to these other components.

In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis-(pentafluorophenyl)borate, N,N-dimethylanilinium tetrakis [3,5-bis(trifluoro-methyl)phenyl]borate, triphenylcarbenium tetrakis[3,5-bis(trifluoromethyl)-phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919, 983, which is incorporated herein by reference in its entirety.

Generally, any amount of organoboron compound can be utilized in this invention. In one aspect, the molar ratio of the organoboron compound to the total of the first and second metallocene compounds in the composition is from about 0.1:1 to about 10:1. Typically, the amount of the fluoroorgano boron or fluoroorgano borate compound used as a cocatalyst for the metallocenes is in a range of from about 0.5 mole to about 10 moles of boron compound per total mole of first and second metallocene compounds combined. In one aspect, the amount of fluoroorgano boron or fluoroorgano borate compound used as a cocatalyst for the metallocene is in a range of from about 0.8 mole to about 5 moles of boron compound per total moles of first and second metallocene compound.

The Optional Ionizing Ionic Compound Cocatalyst

In one aspect, this invention encompasses a catalyst composition comprising a first metallocene compound, a second metallocene compound, at least one chemically-treated solid oxide, and at least one organoaluminum compound. In another aspect, the present invention provides a catalyst composition comprising an optional ionizing ionic compound cocatalyst in addition to these other components. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance the activity of the catalyst composition. While not bound by theory, it is believed that the ionizing ionic compound may be capable of reacting with the first, second, or both metallocene compounds and converting the metallocenes into a cationic metallocene compounds, or incipient cationic metallocene compounds. Again, while not intending to be bound by theory, it is believed that the ionizing ionic compound may function as an ionizing compound by completely or partially extracting an anionic ligand, possibly a non-$\eta^5$-alkadienyl ligand such as ($X^3$) or ($X^4$), from the metallocenes. However, the ionizing ionic compound is an activator regardless of whether it is ionizes the metallocenes, abstracts an ($X^3$) or ($X^4$) ligand in a fashion as to form an ion pair, weakens the metal-($X^3$) or metal-($X^4$) bond in the metallocenes, simply coordinates to an ($X^3$) or ($X^4$) ligand, or any other mechanisms by which activation may occur.

Further, it is not necessary that the ionizing ionic compound activate the metallocenes only. The activation function of the ionizing ionic compound is evident in the enhanced activity of catalyst composition as a whole, as compared to a catalyst composition containing catalyst composition that does not comprise any ionizing ionic compound. It is also not necessary that the ionizing ionic compound activate both first and second metallocene compounds, nor is it necessary that it activate the first metallocene compound and the second metallocene compounds to the same extent.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5 -bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethyl-phenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethylphenyl)aluminate, tri(n-butyl)ammonium tetrakis(3,5-dimethylphenyl)aluminate, tri (n-butyl)ammonium tetrakis(pentafluorophenyl)aluminate, N,N-dimethylanilinium tetrakis(p-tolyl)aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethylphenyl)aluminate, N,N-dimethylanilinium tetrakis(pentafluorophenyl)aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluniinate, tropylium tetrakis(3,5-dimethylphenyl)aluminate, tropylium tetrakis(pentafluorophenyl)aluminate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5 -dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis(3,5-dimethylphenyl)aluminate, potassium tetrafluoroaluminate, and the like. However, the optional ionizing ionic compounds that are useful in this invention are not limited to these.

The Olefin Monomer

In one aspect, unsaturated reactants that are useful in the polymerization processes with catalyst compositions and processes of this invention typically include olefin compounds having from about 2 to about 30 carbon atoms per molecule and having at least one olefinic double bond. This invention encompasses homopolymerization processes using a single olefin such as ethylene or propylene, as well as copolymerization reactions with at least one different olefinic compound. In one aspect of a copolymerization reaction of ethylene, copolymers of ethylene comprise a major amount of ethylene (>50 mole percent) and a minor amount of comonomer <50 mole percent), though this is not a requirement. The comonomers that can be copolymerized with ethylene should have from three to about 20 carbon atoms in their molecular chain.

Acyclic, cyclic, polycyclic, terminal ($\alpha$), internal, linear, branched, substituted, unsubstituted, functionalized, and non-functionalized olefins may be employed in this invention. For example, typical unsaturated compounds that may be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

In one aspect, when a copolymer is desired, the monomer ethylene may be copolymerized with a comonomer. In another aspect, examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer may be selected from 1-butene, 1-pentene, 1-hexene, 1-octene, 1-decene, or styrene.

In one aspect, the amount of comonomer introduced into a reactor zone to produce the copolymer is generally from about 0.01 to about 50 weight percent comonomer based on the total weight of the monomer and comonomer. In another aspect, the amount of comonomer introduced into a reactor zone is from about 0.01 to about 40 weight percent comonomer, and in still another aspect, from about 0.1 to about 35weight percent comonomer based on the total weight of the monomer and comonomer. . Alternatively, an amount sufficient to give the above described concentrations by weight, in the copolymer produced can be used.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but are not limited to, 1,3-butadiene, isoprene, 1,4-pentadiene, and 1,5-hexadiene.

Preparation of the Catalyst Composition

In one aspect, this invention encompasses a catalyst composition comprising the contact product of a first metallocene compound, a second metallocene compound, at least one chemically-treated solid oxide, and at least one organoaluminum compound. In another aspect, this invention encompasses methods of making the catalyst composition encompassing contacting a first metallocene compound, a second metallocene compound, at least one chemically-treated solid oxide, and at least one organoaluminum compound, in any order. In this aspect, an active catalyst composition is obtained with the catalyst components are contacted in any sequence or order.

In another aspect of this invention, the first metallocene compound, the second metallocene compound, or both can optionally be precontacted with an olefinic monomer, not necessarily the olefin monomer to be polymerized, and an organoaluminum cocatalyst for a first period of time prior to contacting this precontacted mixture with the chemically treated solid oxide. In one aspect, the first period of time for contact, the precontact time, between the metallocene compound or compounds, the olefinic monomer, and the organoaluminum compound typically range from time about 0.1 hour to about 24 hours, and from about 0.1 to about 1 hour is typical. Precontact times from about 10 minutes to about 30 minutes are also typical.

In yet another aspect of this invention, once the precontacted mixture of the first, second, or both metallocene compounds, olefin monomer, and organoaluminum cocatalyst is contacted with the chemically treated solid oxide, this composition (further comprising the chemically treated solid oxide) is termed the postcontacted mixture. Typically, the postcontacted mixture may optionally be allowed to remain in contact for a second period of time, the postcontact time, prior to being initiating the polymerization process. In one aspect, postcontact times between the precontacted mixture and the chemically treated solid oxide may range in time from about 0.1 hour to about 24 hours. In another aspect, for example, postcontact times from about 0.1 hour to about 1 hour are typical.

In one aspect, the precontacting, the postcontacting step, or both may increase the productivity of the polymer as compared to the same catalyst composition that is prepared without precontacting or postcontacting. However, neither a precontacting step nor a postcontacting step are required for this invention.

The postcontacted mixture may be heated at a temperature and for a duration sufficient to allow adsorption, impregnation, or interaction of precontacted mixture and the chemically treated solid oxide, such that a portion of the components of the precontacted mixture is immobilized, adsorbed, or deposited thereon. For example, the postcontacted mixture may be heated from between about 0° F. to about 150° F. Temperatures between about 40° F. to about 95° F. are typical if the mixture is heated at all.

In one aspect, the molar ratio of the total moles of first and second metallocene compounds combined to the organoaluminum compound may be from about 1:1 to about 1:10,000. In another aspect, the molar ratio of the total moles of first and second metallocene compounds combined to the organoaluminum compound may be from about 1:1 to about 1:1,000, and in another aspect, from about 1:1 to about 1:100. These molar ratios reflect the ratio of the total moles of first and second metallocene compounds combined to the total amount of organoaluminum compound in both the precontacted mixture and the postcontacted mixture combined.

When a precontacting step is used, generally, the molar ratio of olefin monomer to total moles of first and second metallocene compounds combined in the precontacted mixture may be from about 1:10 to about 100,000:1, or from about 10:1 to about 1,000:1.

In another aspect of this invention, the weight ratio of the chemically treated solid oxide to the organoaluminum compound may range from about 1:5 to about 1,000:1. In another aspect, the weight ratio of the chemically treated solid oxide to the organoaluminum compound may be from about 1:3 to about 100:1, and in yet another aspect, from about 1:1 to about 50:1.

In a further aspect of this invention, the weight ratio of the first and second metallocene compounds combined to the chemically treated solid oxide may be from about 1:1 to about 1:1,000,000. In yet another aspect of this invention, the weight ratio of the total moles of first and second metallocene compounds combined to the chemically treated solid oxide which may be from about 1:10 to about 1:100,00, and in another aspect, from about 1:20 to about 1:1000.

One aspect of this invention is that aluminoxane is not required to form the catalyst composition disclosed herein, a feature that allows lower polymer production costs. Accordingly, in one aspect, the present invention can use $AlR_3$-type organoaluminum compounds and a chemically treated solid oxide in the absence of aluminoxanes. While not intending to be bound by theory, it is believed that the organoaluminum compounds likely does not activate the metallocene catalyst in the same manner as an organoaluminoxane.

Additionally, no expensive borate compounds or $MgCl_2$ are required to form the catalyst composition of this invention, although aluminoxanes, organoboron compounds, ionizing ionic compounds, organozinc compounds, $MgCl_2$, or any combination thereof can optionally be used in the catalyst composition of this invention. Further, in one aspect, cocatalysts such as aluminoxanes, organoboron compounds, ionizing ionic compounds, organozinc compounds, or any combination thereof may be used as cocatalysts with the first and second metallocene compounds, either in the presence or in the absence of the chemically treated solid oxide, and either in the presence or in the absence of the organoaluminum compounds.

In one aspect, the catalyst activity of the catalyst of this invention is typically greater than or equal to about 100 grams polyethylene per gram of chemically treated solid oxide per hour (abbreviated gP/(gCTSO·hr)). In another aspect, the catalyst of this invention may be characterized by an activity of greater than or equal to about 250 gP/(gCTSO·hr), and in another aspect, an activity of greater than or equal to about 500 gP/(gCTSO·hr). In still another aspect, the catalyst of this invention may be characterized by an activity of greater than or equal to about 1000 gP/(gCTSO·hr), and in another aspect, an activity of greater than or equal to about 2000 gP/ (gCTSO·hr). This activity is measured under slurry polymerization conditions, using isobutane as the diluent, and with a polymerization temperature of about 90° C., and an ethylene pressure of about 550 psig. The reactor should have substantially no indication of any wall scale, coating or other forms of fouling upon making these measurements.

In still another aspect of this invention, any combination of the first metallocene compound, the second metallocene compound, the chemically-treated solid oxide, the organoaluminum compound, and the olefin monomer, can optionally be precontacted. In this aspect, when any precontacting occurs with an olefinic monomer, it is not necessary that the olefin monomer used in the precontacting step be the same as the olefin to be polymerized. Further, in one aspect, when a precontacting step among any combination of the catalyst components is employed for a first period of time prior, this precontacted mixture may be used in a subsequent, postcontacting step between any other combination of catalyst components for a second period of time. In one aspect, for example, all the catalyst components and 1-hexene can be used in a precontacting step for a first period of time, and this precontacted mixture can then be contacted with the chemically treated solid oxide to form a postcontacted mixture, that is contacted for a second period of time prior to initiating the polymerization reaction. In one aspect, for example, the first period of time for contact, the precontact time, between any combination of the first metallocene compound, the second metallocene compound, the olefinic monomer, the chemically-treated solid oxide, and the organoaluminum compound typically range from time about 0.1 hour to about 24 hours, and from about 0.1 to about 1 hour is typical. Precontact times from about 10 minutes to about 30 minutes are also typical. In this aspect, the postcontacted mixture may optionally be allowed to remain in contact for a second period of time, the postcontact time, prior to being initiating the polymerization process. In one aspect, postcontact times between the precontacted mixture and any remaining catalyst components may range in time from about 0.1 hour to about 24 hours. In another aspect, for example, postcontact times from about 0.1 hour to about 1 hour are typical.

Utility of the Catalyst Composition in Polymerization Processes

Polymerizations using the catalysts of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce ethylene-containing polymers can be utilized. For example, a stirred reactor can be utilized for a batch process, or the reaction can be carried out continuously in a loop reactor or in a continuous stirred reactor. In one aspect, for example, the polymerization reaction of this invention is carried out in a loop reactor.

After catalyst activation, a catalyst composition is used to homopolymerize ethylene, or copolymerize ethylene with a comonomer. In one aspect, a typical polymerization method is a slurry polymerization process (also known as the particle form process), which is well known in the art and is disclosed, for example in U.S. Pat. No. 3,248,179, which is incorporated by reference herein, in its entirety. Other polymerization methods of the present invention for slurry processes are those employing a loop reactor of the type disclosed in U.S. Pat. No. 3,248,179, and those utilized in a plurality of stirred reactors either in series, parallel, or combinations thereof, wherein the reaction conditions are different in the different reactors, which is also incorporated by reference herein, in its entirety.

In one aspect, polymerization temperature for this invention may range from about 60° C. to about 280° C., and in another aspect, polymerization reaction temperature may range from about 70° C. to about 110° C.

The polymerization reaction typically occurs in an inert atmosphere, that is, in an atmosphere substantial free of oxygen and under substantially anhydrous conditions, thus, in the absence of water as the reaction begins. Therefore a dry, inert atmosphere, for example, dry nitrogen or dry argon, is typically employed in the polymerization reactor.

The polymerization reaction pressure can be any pressure that does not terminate the polymerization reaction, and is typically conducted at a pressure higher than the pretreatment pressures. In one aspect, polymerization pressures may be from about atmospheric pressure to about 1000 psig. In another aspect, polymerization pressures may be from about 50 psig to about 800 psig. Further, hydrogen can be used in the polymerization process of this invention to control polymer molecular weight.

Polymerizations using the catalysts of this invention can be carried out in any manner known in the art. Such processes that can polymerize monomers into polymers include, but are not limited to slurry polymerizations, gas phase polymerizations, solution polymerizations, and multi-reactor combinations thereof. Thus, any polymerization zone known in the art to produce olefin-containing polymers can be utilized. For example, a stirred reactor can be utilized for a batch process, or the reaction can be carried out continuously in a loop reactor or in a continuous stirred reactor. Typically, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any one, or combination of, a catalyst storage system, an extrusion system, a cooling system, a diluent recycling system, or a control system. Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

Polymerization reactor systems of the present invention can comprise one type of reactor per system or multiple reactor systems comprising two or more types of reactors operated in parallel or in series. Multiple reactor systems can comprise reactors connected together to perform polymerization, or reactors that are not connected. The polymer can be polymerized in one reactor under one set of conditions, and then the polymer can be transferred to a second reactor for polymerization under a different set of conditions.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

After the polymers are produced, they can be formed into various articles, including but not limited to, household containers, utensils, film products, drums, fuel tanks, pipes, geomembranes, and liners. Various processes can form these articles. Usually, additives and modifiers are added to the polymer in order to provide desired effects. By using the invention described herein, articles can likely be produced at a lower cost, while maintaining most or all of the unique properties of polymers produced with metallocene catalysts.

Ethylene Polymers Prepared According to this Invention

Tables 1 through 8 and the Examples provide data for the polyethylene resins produced using the catalyst compositions of this invention, and for polyethylene resins produced using standard or comparative catalyst compositions. Table 1 provides a summary of catalyst pretreatments, while Table 2 provides a listing of components used for the precontacting step in the precontactor.

A polymerization run using a first metallocene, ($\eta^5$-$C_5H_4$″Bu)$_2$ZrCl$_2$ (A) alone was conducted because ($\eta^5$-$C_5H_4$″Bu)$_2$ZrCl$_2$ is used as a first metallocene in many of the Examples provided herein. These data appear in Tables 3A and 3B and provide a baseline or control by which to compare the dual metallocene catalyst compositions.

A polymerization using the first metallocene, ($\eta^5$-$C_5H_4$″Bu)$_2$ZrCl$_2$ (A) combined with the tightly-bridged second metallocene, methyl-3-butenylmethylidene($\eta^5$-cyclopentadienyl)($\eta^5$-9-fluorenyl)zirconium dichloride (B) was also conducted. Tables 4A and 4B provide the resin and film properties for polyethylene prepared using this dual metallocene catalyst. Thus, when ($\eta^5$-$C_5H_4$″Bu)$_2$ZrCl$_2$ was combined with a metallocene that is tightly-bridged by a single carbon atom, the resulting resin was characterized by a lower MI as compared to using ($\eta^5$-$C_5H_4$″Bu)$_2$ZrCl$_2$ alone, but also substantially decreases MD tear.

A polymerization run using the first metallocene, ($\eta^5$-$C_5H_4$″Bu)$_2$ZrCl$_2$ (A) combined with a tightly-bridged second metallocene, either compound C or D as shown in Tables 5A and 5B, was also conducted. Tables 5A and 5B provide the resin and film properties for polyethylene prepared using this dual metallocene catalyst. Thus, when ($\eta^5$-$C_5H_4$″Bu)$_2$ZrCl$_2$ was combined with a tightly-bridged metallocene, specifically, a metallocene bridged by a single silicon atom, the resulting resin was characterized by a lower MI as compared to using ($\eta^5$-$C_5H_4$"Bu)$_2$ZrCl$_2$ alone, but also a substantially decreased MD tear.

A polymerization run using the first metallocene, ($\eta^5$-$C_5H_4$"Bu)$_2$ZrCl$_2$ (A) combined with a second, loosely-bridged metallocene, either compound E, F, or G as shown in Tables 6A and 6B was also conducted. Tables 6A and 6B provide the resin and film properties for polyethylene prepared using this dual metallocene catalyst. Thus, when ($\eta^5$-$C_5H_4$"Bu)$_2$ZrCl$_2$ was combined with a loosely-bridged metallocene, specifically, a 3- or 4-carbon atom bridged metallocene, the resulting resin was characterized by a lower MI as compared to using ($\eta^5$-$C_5H_4$"Bu)$_2$ZrCl$_2$ alone, without decreasing MD tear, and with generally decreasing haze.

A polymerization run using the first metallocene, ($\eta^5$-$C_5H_4$"Bu)$_2$ZrCl$_2$ (A) combined with a second, more highly-substituted metallocene, compound ($\eta^5$-$C_5H_3$"BuMe)$_2$ZrCl$_2$ (H), as shown in Tables 7A and 7B, was also conducted. Tables 7A and 7B provide the resin and film properties for polyethylene prepared using this dual metallocene catalyst. Thus, when ($\eta^5$-$C_5H_4$"Bu)$_2$ZrCl$_2$ was combined with a more highly-substituted metallocene such as ($\eta^5$-$C_5H_3$"BuMe)$_2$ZrCl$_2$, specifically, a metallocene wherein the cyclopentadienyl-type ligand is more highly-substituted, the resulting resin was characterized by a lower MI as compared to using ($\eta^5$-$C_5H_4$"Bu)$_2$ZrCl$_2$ alone, without substantially decreasing MD tear.

A polymerization run using the first metallocene, ($\eta^5$-$C_5H_4$"Bu)$_2$ZrCl$_2$ (A) combined with the second hafnium metallocene ($\eta^5$-$C_5H_4$"Bu)$_2$HfCl$_2$ (I) was also conducted. Tables 8A and 8B provides the resin and film properties for polyethylene prepared using this dual metallocene catalyst. Thus, when ($\eta^5$-$C_5H_4$"Bu)$_2$ZrCl$_2$ was combined with a hafnium metallocene ($\eta^5$-$C_5H_4$"Bu)$_2$HfCl$_2$, the resulting resin was characterized by a lower MI as compared to using ($\eta^5$-$C_5H_4$"Bu)$_2$ZrCl$_2$ alone, without substantially decreasing MD tear.

In one aspect, for example, the data disclosed herein indicate that, among other things, under the practical conditions of a loop reactor, a catalyst in which ($\eta^5$-$C_5H_4$"Bu)$_2$ZrCl$_2$ (A) is the only metallocene employed affords polymer which is generally too high in MI to afford adequate melt strength for blowing film. Additionally, given the high MI and narrow molecular weight distribution of such polymers, ($\eta^5$-$C_5H_4$"Bu)$_2$ZrCl$_2$ (A) provides a polymer with too much haze for many LLDPE film applications. However, upon adding the second metallocene which produces higher molecular weight polymer to the catalyst composition provides a polymer with a lower MI, and hence, increased melt strength for blowing film, without sacrificing useful polymer film properties such as MD tear. In this aspect, the second metallocene compounds, when employed in the catalyst compositions without a first metallocene compound, possess sufficient activity, the addition of hydrogen to control MI may not be necessary in the dual metallocene catalyst compositions of this invention.

In one aspect, for example, the resins and films of this invention may be characterized by polymer properties that can fall in these ranges: melt index from about 0.3 to about 2.0 dg/min; density from about 0.94 to about 0.91 g/cm$^3$; CY-a parameter from about 0.45 to about 0.70; polydispersity index ($M_w/M_n$) from about 2 to about 6; HLMI/MI ratio is from about 16.5 to about 25; Elmendorf MD tear resistance greater than about 150 g for a 1 mil blown film; Elmendorf TD tear resistance is greater than about 350 g for a 1 mil blown film; film haze of less than about 25% for a 1 mil blown film; Dart impact strength greater than about 600 g for a 1 mil blown film; and Spencer impact strength greater than about 0.7 J for a 1 mil blown film.

In another aspect, for example, the resins and films of this invention may be characterized by polymer properties that can fall in these ranges: melt index from about 0.5 to about 1.5 dg/min; density from about 0.935 to about 0.915 g/cm$^3$; CY-a parameter from about 0.50 to about 0.65; polydispersity index ($M_w/M_n$) from about 2.2 to about 5.0; HLMI/MI ratio is from about 17 to about 24; Elmendorf MD tear resistance greater than about 200 g for a 1 mil blown film; Elmendorf TD tear resistance greater than about 380 g for a 1 mil blown film; film haze of less than about 15% for a 1 mil blown film; Dart impact strength greater than about 800 g for a 1 mil blown film; and Spencer impact strength greater than about 0.9 J for a 1 mil blown film.

In yet another aspect, for example, the resins and films of this invention may be characterized by polymer properties that can fall in these ranges: melt index from about 0.8 to about 1.3 dg/min; density from about 0.925 to about 0.915 g/cm$^3$; CY-a parameter from about 0.53 to about 0.62; polydispersity index ($M_w/M_n$) from about 2.6 to about 4.0; HLMI/MI ratio from about 17.5 to about 23; Elmendorf MD tear resistance greater than about 250 g for a 1 mil blown film; Elmendorf TD tear resistance greater than about 450 g for a 1 mil blown film; film haze less than about 10% for a 1 mil blown film; Dart impact strength greater than about 1200 g for a 1 mil blown film; and Spencer impact strength greater than about 1.00 J for a 1 mil blown film.

In a further aspect of this invention, the polymer of this invention is characterized by a melt index (MI) from about 0.3 to about 2.0 dg/min. In another aspect, the MI is from about 0.5 to about 1.5 dg/min, and in still another aspect, the MI is from about 0.8 to about 1.3 dg/min.

In yet another aspect of this invention, the polymer of this invention is characterized by a density from about 0.94 to about 0.91 g/cm$^3$. In still another aspect, the density is from about 0.935 to about 0.915 g/cm$^3$, and in another aspect, the density is from about 0.925 to about 0.915 g/cm$^3$.

In yet another aspect of this invention, the polymer of this invention is characterized by a CY-a parameter from about 0.45 to about 0.70. In still another aspect, the CY-a parameter is from about 0.50 to about 0.65, and in another aspect, the CY-a parameter is from about 0.53 to about 0.62.

In yet another aspect of this invention, the polymer of this invention is characterized by a polydispersity index ($M_w/M_n$) from about 2 to about 6. In still another aspect, the polydispersity index ($M_w/M_n$) is from about 2.2 to about 5.0, and in another aspect, the polydispersity index ($M_w/M_n$) is from about 2.6 to about 4.0.

In yet another aspect of this invention, the polymer of this invention is characterized by a HLMI/MI ratio from about 16.5 to about 25. In still another aspect, the HLMI/MI ratio is from about 17 to about 24, and in another aspect, the HLMI/MI ratio is from about 17.5 to about 23.

In yet another aspect of this invention, the polymer of this invention is characterized by an Elmendorf MD tear resistance greater than about 150 g for a 1 mil blown film. In still another aspect, the Elmendorf MD tear resistance is greater than about 200 g for a 1 mil blown film, and in another aspect, the Elmendorf MD tear resistance is greater than about 250 g for a 1 mil blown film.

In yet another aspect of this invention, the polymer of this invention is characterized by an Elmendorf TD tear resistance greater than about 350 g for a 1 mil blown film. In still another aspect, the Elmendorf TD tear resistance is greater than about 380 g for a 1 mil blown film, and in another aspect, the Elmendorf TD tear resistance is greater than about 450 g for a 1 mil blown film.

In yet another aspect of this invention, the polymer of this invention is characterized by a film haze of less than about 25% for a 1 mil blown film. In still another aspect, the film haze) is less than about 15% for a 1 mil blown film, and in another aspect, the film haze is less than about 10% for a 1 mil blown film.

In yet another aspect of this invention, the polymer of this invention is characterized by a Dart impact strength greater than about 600 g for a 1 mil blown film. In still another aspect, the Dart impact strength is greater than about 800 g for a 1 mil blown film, and in another aspect, the Dart impact strength is greater than about 1200 g for a 1 mil blown film.

In yet another aspect of this invention, the polymer of this invention is characterized by a Spencer impact strength greater than about 0.7 J for a 1 mil blown film. In still another aspect, the Spencer impact strength is greater than about 0.9 J for a 1 mil blown film, and in another aspect, the Spencer impact strength is greater than about 1.00 J for a 1 mil blown film.

DEFINITIONS

In order to more clearly define the terms used herein, the following definitions are provided. To the extent that any definition or usage provided by any document incorporated herein by reference conflicts with the definition or usage provided herein, the definition or usage provided herein controls.

The term "polymer" is used herein to mean homopolymers comprising ethylene and copolymers of ethylene and another olefinic comonomer. Polymer is also used herein to mean homopolymers and copolymers of any other polymerizable monomer disclosed herein.

The term "cocatalyst" is generally used herein to refer to the organoaluminum compounds that may constitute one component of the catalyst composition, but also refers to the optional components of the catalyst composition including, but not limited to, aluminoxanes, organoboron compounds, organozinc compounds, or ionizing ionic compounds, as disclosed herein. The term cocatalyst may be used regardless of the actual function of the compound or any chemical mechanism by which the compound may operate. In one aspect, the term cocatalyst is used to distinguish that component of the catalyst composition from the first and second metallocene compounds.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of metallocene compound (first, second, or both), olefin monomer, and organoaluminum compound, before this mixture is contacted with the chemically treated solid oxide and optionally additional organoaluminum compound. Thus, "precontacted" describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of first metallocene compound, first metallocene compound, olefin monomer, organoaluminum compound, and chemically treated solid oxide, formed from contacting the precontacted mixture of a portion of these components with any additional components added to make up the postcontacted mixture. Generally, the additional component added to make up the postcontacted mixture is the chemically treated solid oxide, and optionally may include an organoaluminum compound the same or different from the organoaluminum compound used to prepare the precontacted mixture, as described herein. Accordingly, this invention may also occasionally distinguish between a component used to prepare the postcontacted mixture and that component after the mixture has been prepared.

The term metallocene, as used herein, describes a compound comprising two $\eta^5$-cycloalkadienyl-type ligands in the molecule. Thus, the metallocenes of this invention are bis($\eta^5$-cyclopentadienyl-type ligand) compounds, wherein the $\eta^5$-cycloalkadienyl portions include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst", in much the same way the term "cocatalyst" is used herein to refer to the organoaluminum compound. Unless otherwise specified, the following abbreviations are used: Cp for cyclopentadienyl; Ind for indenyl; and Flu for fluorenyl.

The terms "catalyst composition," "catalyst mixture," and the like do not depend upon the actual product resulting from the contact or reaction of the components of the mixtures, the nature of the active catalytic site, or the fate of the aluminum cocatalyst, the first metallocene compound, the second metallocene compound, any olefin monomer used to prepare a precontacted mixture, or the chemically treated solid oxide after combining these components. Therefore, the terms catalyst composition, catalyst mixture, and the like may include both heterogeneous compositions and homogenous compositions.

The term "hydrocarbyl" is used herein to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms chemically treated solid oxide, solid oxide activator-support, acidic activator-support, activator-support, treated solid oxide compound, or simply activator, and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically treated solid oxide compound comprises the calcined contact product of at least one solid oxide compound with at least one electron-withdrawing anion source compound. Typically, the chemically treated solid oxide comprises at least one ionizing, acidic solid oxide compound. The terms support or activator-support are not used to imply these components are inert, and this component should not be construed as an inert component of the catalyst composition.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substituents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

EXAMPLE 1

General Testing Procedures

Melt index (MI, g/10 min) was determined in accordance with ASTM D1238 condition F at 190° C. with a 2,160 gram weight.

High load melt index (HLMI, g/10 min) was determined in accordance with ASTM D1238 condition E at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

Molecular weights and molecular weight distributions were obtained using a Waters 150 CV gel permeation chromatograph with trichlorobenzene (TCB) as the solvent, with a flow rate of 1 milliliter/minute at a temperature of 140° C. 2,6-Di-t-butyl-4-methylphenol (BHT) at a concentration of 1.0 gram per liter was used as a stabilizer in the TCB. An injection volume of 220 liters was used with a nominal polymer concentration of 0.3 gram/liter at room temperature. Dissolution of the sample in stabilized TCB was carried out by heating at about 160-170° C. for 20 hours with occasional, gentle agitation. The column was two Waters HT-6E columns (7.8 mm×300 mm). The columns were calibrated with a broad linear polyethylene standard (Phillips Marlex.RTM. BHB 5003) for which the molecular weight had been determined.

All the blown film samples were made on a laboratory-scale blown film line using typical linear low-density (LLDPE) conditions as follows: 100 mm (4 inch) die diameter, 1.5 mm (0.060 inch) die gap, 37.5 mm (1.5 inch) diameter single-screw extruder fitted with a barrier screw with a Maddock mixing section at the end (L/D=24, 2.2:1 compression ratio), 115 RPM screw speed [about 27 kg/h (60 lb/h) output rate], 2.5:1 blow up ratio (BUR), "in-pocket" bubble with a "freeze line height" (FLH) between 20-28 cm (8-11 inch), 190° C. (375° F.) barrel 10 and die set temperatures and 1 mil (25 micron) thick film. Cooling was accomplished with a Dual Lip air ring using ambient (laboratory) air at about 25° C. (75-80° F.). These particular processing conditions were chosen since the film properties so obtained are typically representative of those obtained from larger, commercial scale film blowing conditions.

The haze (%) was measured in accordance with the procedures specified in ASTM D 1003-97, using a Haze Gard Plus™ instrument (Model 4725) made by the BYK-Gardner® Company.

Dart impact strength was measured in accordance with ASTM D-1709 (method A).

Pendulum impact strength (more commonly known as Spencer impact) strength was measured in accordance with ASTM D-3420. However, a special (more severe) pendulum head, which was manufactured in-house, was used for these samples since they did not fail with the standard pendulum using the maximum pendulum weight.

Machine (MD) and transverse (TD) direction Elmendorf tear strengths were measured on a Testing Machines Inc. tear tester (Model 83-11-00) in accordance with ASTM D-1922.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta*(\omega)| = \frac{\eta_0}{[1+(\tau_\eta\omega)^a]^{(1-n)/a}},$$

wherein: $|\eta*(\omega)|$=magnitude of complex shear viscosity;
$\eta_0$=zero shear viscosity
$\tau_\eta$=viscous relaxation time
a="breadth" parameter
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hassegger, *Dynamics of Polymeric Liquids, Volume* 1, *Fluid Mechanics,* 2nd Edition, John Wiley & Sons (1987); each of which is incorporated herein by reference in its entirety. The CY "a" parameter is reported in the tables for the resins disclosed herein.

A "Quantachrome Autosorb-6 Nitrogen Pore Size Distribution Instrument" was used to determined specific surface area ("surface area") and specific pore volume ("pore volume"). This instrument was acquired from the Quantachrome Corporation, Syosset, N.Y.

EXAMPLE 2

Preparation of a Fluorided Silica-Alumina Activator-Support

The silica-alumina used to prepare the fluorided silica-alumina acidic activator-support in this Example was obtained from W. R. Grace as Grade MS13-110, containing 13% alumina, having a pore volume of about 1.2 cc/g and a surface area of about 400 m$^2$/g. This material was fluorided by impregnation to incipient wetness with a solution containing ammonium bifluoride in an amount sufficient to equal 10 wt % of the weight of the silica-alumina. This impregnated material was then dried in a vacuum oven for 8 hours at 100° C. The fluorided silica-alumina samples obtained in this manner were then calcined as follows. About 10 grams of the alumina were placed in a 1.75-inch quartz tube fitted with a sintered quartz disk at the bottom. While the silica was supported on the disk, dry air was blown up through the disk at the linear rate of about 1.6 to 1.8 standard cubic feet per hour. An electric furnace around the quartz tube was used to increase the temperature of the tube at the rate of about 400° C. per hour to a final temperature of about 450° C. At this temperature, the silica-alumina was allowed to fluidize for about three hours in the dry air. Afterward, the silica-alumina was collected and stored under dry nitrogen, and was used without exposure to the atmosphere.

EXAMPLE 3

General and Specific Preparations of the Metallocenes

General Methods

General preparative methods for forming the first metallocene compounds and the second metallocene compounds can be found in a various references, including: U.S. Pat. Nos. 4,939,217; 5,191,132; 5,210,352; 5,347,026; 5,399,636; 5,401,817; 5,420,320; 5,436,305; 5,451,649; 5,496,781; 5,498,581; 5,541,272; 5,554,795; 5,563,284; 5,565,592; 5,571,880; 5,594,078; 5,631,203; 5,631,335; 5,654,454; 5,668,230; 5,705,579; 6,509,427; 5,705,579; and 6,509,427; and in Köppl, A. Alt, H. G. *J. Mol. Catal* A. 2001, 165, 23-32; Kajigaeshi, S.; Kadowaki, T.; Nishida, A.; Fujisaki, S. *The Chemical Society of Japan*, 1986, 59, 97; Alt, H. G.; Jung, M.; Kehr, G. *J. Organomet. Chem.* 1998, 562, 153-181; Alt, H. G.; Jung, M. *J. Organomet. Chem.* 1998, 568, 87-112; *Journal of Organometallic Chemistry*, 1996, 522, 39-54; and Wailes, P. C.; Coutts, R. S. P.; Weigold, H. in Organometallic Chemistry of Titanium, Zironium, and Hafnium, Academic; New York, 1974; and Cardin, D. J.; Lappert, M. F.; and Raston, C. L.; Chemistry of Organo-Zirconium and -Hafnium Compounds; Halstead Press; New York, 1986.

Specific Preparations

All manipulations involving air-sensitive reagents and materials were performed under nitrogen by using Schlenk line or dry box techniques. THF was distilled from potassium. Anhydrous diethyl ether, methylene chloride, pentane and toluene were obtained from Fisher Scientific Company and stored over activated alumina. All solvents were degassed and stored under nitrogen. Zirconium(IV) chloride (99.5%) and n-butyllithium were purchased from Aldrich and used as received. Products were analyzed by $^1$H NMR (300 MHz, CDCl$_3$, referenced against the peak of residual CHCl$_3$ at 7.24 ppm) or $^{13}$C NMR (75 MHz, CDCl$_3$, referenced against central line of CDCl$_3$ at 77.00 ppm).

Preparation of rac-C$_3$H$_6$(Ind)$_2$ZrCl$_2$ (E)

a. Synthesis of 1,3-bis(3-indenyl)propane. Technical grade indene (92% GC purity) (200 mL) was mixed with 1 liter of dry THF under nitrogen. The solution was cooled with dry ice and n-BuLi (640 mL, 2.5 M in hexanes, 1.6 mols) was added over a period of 45 minutes. The dry ice bath was removed allowing the mixture to warm while stirring for 2 hours at room temperature. The resulting red solution was gradually added to 1,3-dibromopropane (75 mL, 0.74 moles) in 100 mL of dry THF at 0° C. over a period of 45 minutes, and the resulting mixture was stirred for 14 hours at room temperature. The final resulting solution was cooled to below 5° C. and held below 6° C. while adding 600 mL of 3 M HCl aqueous solution. After the ice bath was removed, the yellow mixture was stirred for 1 hour. This mixture was extracted with 200 mL of diethyl ether, and the resulting organic layer was washed with 3×300 mL of water and 100 mL of brine and then dried over anhydrous sodium sulfate and filtered. As the solvent was removed under vacuum a white solid began to form. The mixture was cooled to −15° C. in a freezer overnight. The solid was broken up, filtered off, and washed with cold methanol. After air drying and breaking up further and drying further, a slightly yellow solid (167.3 g, 83% yield) was obtained. $^1$H NMR (300 MHz, CDCl$_3$) δ 7.53 (d, J=7.2 Hz, 2H), 7.43 (d, J=7.2 Hz, 2H), 7.36 (t, J=7.2 Hz, 2H), 7.26 (t, J=7.2 Hz, 2H), 6.31 (broad s, 2H), 3.39 (d, J=1.8 Hz, 4H), 2.65-2.80 (dt, J=7.2 Hz, 1.2 Hz, 4H), 2.17 (quin, J=7.2 Hz, 2H); $^{13}$C NMR (75 MHz, CDCl$_3$) δ 145.5, 144.5, 144.2, 127.9, 126.0, 124.5, 123.7, 118.9, 37.7, 27.6, 26.2.

b. Synthesis of rac-C$_3$H$_6$(Ind)$_2$ZrCl$_2$. The ligand 1,3-bis (indenyl)propane (10.88 g, 40 mmol) was dissolved in 400 mL of dry THF and cooled to −78° C. under nitrogen. A portion of n-BuLi (33.6 mL, 2.5 M in hexanes, 84 mmol) was added dropwise over 30 minutes to the solution. The resulting mixture was warmed to room temperature and stirred for an additional 3 hours, giving rise to a red brown solution. Into a separate flask cooled to −78° C. and containing ZrCl$_4$ (9.8 g, 42 mmol) was added 20 mL of pentane followed by a slow addition of 410 mL of THF, giving rise to a white suspension. After warming to room temperature and stirring for an additional 2 hours, the suspension fully dissolved to yield a clear, colorless solution. Both solutions were simultaneously added, via cannula, over 4 hours to a third flask containing 50 mL of rapidly stirred THF at room temperature. After the addition was completed, the solution was stirred overnight at room temperature, giving rise to an orange solution. Removal of the solvent gave an orange solid (a crude product). According to the ¹H NMR spectrum of the crude product, the ratio of racemic isomer to meso isomer is about 10 to 1. Toluene (800 mL) was added to the crude product to give an off yellow solid and an orange yellow solution. The solid was removed by centrifuge. After reducing the volume of the filtrate to about 250 mL, pentane was added slowly until the solution just started to turn cloudy. The mixture was stored at −15° C. The yellow racemic isomer was crystallized out from the mixture at −15° C. The combined first two crops gave 5.8 g (33.5% yield) of the titled product. ¹H NMR (300 MHz, CDCl₃) δ 7.64 (d, J=8.4 Hz, 2H), 7.58 (d, J=8.4 Hz, 2H), 7.29-7.34 (m, 2H), 7.14-7.20 (m, 2H), 6.20 (d, J=4.2 Hz, 2H), 6.08 (d, J=4.2 Hz, 2H), 3.06-3.16 (m, 2H), 2.86-2.97 (m, 2H), 2.36-2.45 (m, 2H); ¹³C NMR (75 MHz, CDCl₃) δ 127.6, 126.8, 126.5, 126.2, 125.4, 122.9, 122.4, 114.8, 105.8, 30.3, 25.4.

Preparation of rac-C₄H₈(Ind)₂ZrCl₂ (G)

a. Synthesis of 1,4-bis(3-indenyl)butane. Technical grade indene (92% GC purity) (54.4 mL) was mixed with 720 mL of dry THF under nitrogen. The solution was cooled with dry ice and n-BuLi (184 mL, 2.5 M in hexanes, 0.46 moles) was added dropwise. The dry ice bath was removed allowing the mixture to warm while stirring for 4 hours at room temperature. The resulting red solution was added dropwise to 1,4-dibromobutane (43.2 g, 0.2 moles) in 80 mL of dry THF at 0° C. The resulting mixture was stirred overnight at room temperature. The final resulting solution was quenched with 5 wt % HCl in ice bath. The mixture from above was extracted with diethyl ether. The resulting organic layer was washed with water and then dried over anhydrous sodium sulfate and filtered. Removal of the solvent gave a pale yellow solid. The solid was washed with hot pentane to afford the product as a pale yellow solid (45 g, 78.7% yield). ¹H NMR (300 MHz, CDCl₃) δ 7.49 (d, J=7.4 Hz, 2H), 7.36 (d, J=7.4 Hz, 2H), 7.29 (t, J=7.3 Hz, 2H), 7.19 (dt, J=7.3 Hz, 1.4 Hz, 2H), 6.20 (quin, J=1.9 Hz, 2H), 3.31 (q, J=1.9 Hz, 4H), 2.66-2.56 (m, 4H), 1.85-1.78 (m, 4H); ¹³C NMR (75 MHz, CDCl₃) δ 145.5, 144.5, 144.4, 127.7, 125.9, 124.4, 123.7, 118.9, 37.6, 27.9, 27.6 (Interpolated Peak Listing).

b. Synthesis of rac-C₄H₈(Ind)₂ZrCl₂. The ligand 1,4-bis(3-indenyl)butane (6.66 g, 23.2 mmol) was dissolved in 250 mL of dry THF and cooled to −78° C. under nitrogen. A portion of n-BuLi (19.5 mL, 2.5 M in hexanes, 48.7 mmol) was added dropwise to the ligand solution. The resulting mixture was warmed to room temperature and stirred for an additional 3.5 hours. Into a separate flask cooled to −78° C. and containing ZrCl₄ (5.7 g, 24.5 mmol) was added 15 mL of pentane followed by a slow addition of 255 mL of THF, giving rise to a white suspension. After warming to room temperature and stirring for an additional 3 hours, the suspension fully dissolved to yield a clear, colorless solution. Both solutions were simultaneously added, via cannula, over 4 hours to a third flask containing 40 mL of rapidly stirred THF at room temperature. After the addition was completed, the solution was stirred overnight at room temperature. Removal of the solvent gave an orange-yellow solid (crude product). Toluene (700 mL) was added to the crude product to give an off yellow solid and a yellow solution. The solid was removed by centrifuge. After reducing the volume of the filtrate to about 250 mL, pentane was added slowly until the solution just started to turn cloudy. The mixture was stored at −10 to −15° C. The yellow racemic isomer was crystallized out from the mixture. The combined first two crops gave 2.18 g (21% yield) of the titled product. ¹H NMR (300 MHz, CDCl₃) δ 7.69 (d, J=8.6 Hz, 2H), 7.52 (d, J=8.6 Hz, 2H), 7.31 (t, J=7.3 Hz, 2H), 7.21 (t, J=7.3 Hz, 2H), 6.59 (d, J=3.3 Hz, 2H), 5.55 (d, J=3.3 Hz, 2H), 3.35-3.20 (dd, J=16.1 Hz, 10.5 Hz, 2H), 3.17-3.05 (dd, J=16.4 Hz, 5.6 Hz, 2H), 2.33-2.18 (m, 2H), 2.13-1.97 (m, 2H); ¹³C NMR (75 MHz, CDCl₃) δ 128.4, 126.7, 125.8, 125.3, 122.7, 121.3, 118.0, 103.3, 27.6, 26.7.

Rac-Me₂Si(2-Me-4-PhInd)₂ZrCl₂ (D), rac-Me₂Si(2-MeInd)₂ZrCl₂ (C), meso-C₃H₆(Ind)₂ZrCl₂ (F), (η⁵-3-Me,1-n-BuC₅H₃)₂ZrCl₂ (H), (η⁵-C₅H₄ⁿBu)₂ZrCl₂ (A) and (η⁵-C₅H₄ⁿBu)₂HfCl₂ (I) were purchased from Boulder Scientific and used as received.

Methyl-3-butenylmethylidene(η⁵-cyclopentadienyl)(η⁵-9-fluorenyl)zirconium dichloride (B) was prepared as described in U.S. Pat. No. 5,498,581.

EXAMPLE 4

Preparation of Metallocene Solutions and Precontactor Feeds

Metallocene solutions and precontactor feeds were prepared as described below using one of Methods A, B, C, D or E as detailed herein. The amounts of metallocenes, solvents, organoaluminum compounds, and 1-hexene (when appropriate) are indicated in Table 1, along with the Example number associated with each of the runs shown.

Method A. The appropriate amount of metallocene was dissolved in dry, degassed solvent under nitrogen at room temperature. The solution was transferred to a steel vessel and diluted with isobutane to give a total of 40 pounds. This solution was fed to the precontactor.

Method B. The appropriate amount of metallocene was dissolved in dry, degassed solvent under nitrogen at room temperature. In some cases 1-hexene was also added as indicated in Table 1. While stirring at room temperature, 93 wt % (neat) triethylaluminum (amount as indicated in Table 1) was added. The solution was stirred for 30 to 60 minutes and then diluted with additional solvent. The solution was transferred to a steel vessel and diluted with isobutane to give a total of 40 pounds. This solution was fed to the precontactor.

Method C. The appropriate amounts of metallocenes were dissolved in dry, degassed solvent under nitrogen. This solution was transferred to a steel vessel and diluted with isobutane to give a total of 40 pounds. This solution was fed to the precontactor.

Method D. About 150 mL of toluene was added to the flask containing the appropriate amounts of metallocenes followed by addition of TEA (triethylaluminum) and 1-hexene at room temperature. The mixture was stirred for 2 hr at room temperature, then charged into a steel vessel. The rest of toluene was then added and the contents were diluted with isobutane to a total of 40 pounds. This solution was fed to the precontactor.

Method E. Solution A: rac-C₃H₆(Ind)₂ZrCl₂ (E) was suspended in 1-hexene, TEA was added to the suspension followed by addition of some heptane (250-500 g) at room temperature. The mixture was heated at 50-55° C. overnight, then cooled to room temperature. Solution B: (n-BuCp)₂ZrCl₂ (A) was dissolved in heptane (ca. 500 g) followed by addition of TEA, the mixture was stirred for several hours. Solutions A and B were premixed, then charged into a steel vessel followed by adding the rest of heptane. Finally, the contents were diluted to a total of 40 pounds with isobutane.

Precontactor Feeds. The catalyst and co-catalyst feed ratios to the precontactor are shown in Table 2.

TABLE 1

Summary of Catalyst Pretreatments

| Table No | Example No. | Solution Method | Metallocene Type | Metallocene Amount (g) | TEA (93%) Amount (g) | 1-Hexene Amount (g) | Solvent Type | Solvent (g) |
|---|---|---|---|---|---|---|---|---|
| 3 | 6.1 | A | A | 1.1 | 0 | 0 | Toluene | 584.2 |
| 3 | 6.2 | B | A | 1.009 | 25.0 | 0 | Heptane | 1196.4 |
| 3 | 6.3[a] | A | A | 0.256 | 0 | 0 | Toluene | 384.0 |
| 4 | 7.1 | A | A | 0.516 | 0 | 0 | Heptane | 561 |
|   |     | B | B | 4.0 | 34.0 | 92.0 | Heptane | 2195 |
| 4 | 7.2 | A | A | 0.516 | 0 | 0 | Heptane | 561 |
|   |     | B | B | 4 | 34.0 | 92.0 | Heptane | 2195 |
| 5 | 8.1 | B | C | 1.0 | 28.4 | 0 | Toluene | 2790 |
|   |     | A | A | 1.026 | 0 | 0 | Toluene | 833.9 |
| 5 | 8.2 | B | C | 1.0 | 28.4 | 0 | Toluene | 2790 |
|   |     | A | A | 1.07 | 0 | 0 | Toluene | 697.6 |
| 5 | 8.3 | B | D | 1.00 | 29.0 | 0 | Toluene | 2792 |
|   |     | A | A | 1.07 |  | 0 | Toluene | 697.6 |
| 6 | 9.1 | D | G | 0.497 | 12.5 | 137 | Toluene | 3049.6 |
|   |     | A | A | 1.14 | 0 | 0 | Toluene | 544.7 |
| 6 | 9.2 | D | G | 0.497 | 12.5 | 137 | Toluene | 3049.6 |
|   |     | A | A | 1.14 | 0 | 0 | Toluene | 544.7 |
| 6 | 9.3 | D | E | 0.25 | 12.5 | 113 | Toluene | 2999.2 |
|   |     | A | A | 1.1 | 0 | 0 | Toluene | 584.2 |
| 6 | 9.4 | D | E | 0.57 | 12.5 | 123 | Toluene | 3092 |
|   |     | A | A | 1.1 | 0 | 0 | Toluene | 584.2 |
| 6 | 9.5 | D | E | 0.57 | 12.5 | 123 | Toluene | 3092 |
|   |     | A | A | 1.1 | 0 | 0 | Toluene | 561.0 |
| 6 | 9.6 | D | E | 0.57 | 12.5 | 123 | Toluene | 3092 |
|   |     | A | A | 1.1 | 0 | 0 | Toluene | 561.0 |
| 6 | 9.7 | E | E/A | 1.0/0.937 | 21.3 | 112 | heptane | 2222 |
| 6 | 9.8 | E | E/A | 1.0/0.936 | 21.3 | 193.5 | heptane | 2883.6 |
| 6 | 9.9 | E | E/A | 2.0/0.93 | 38.1 | 366 | heptane | 3001.9 |
| 6 | 9.10 | A | A | 1.00 | 0 | 0 | Heptane | 2278 |
|   |      | B | F | 1.017 | 26.3 | 40.3 | Heptane | 2137 |
| 6 | 9.11 | A | A | 1.0 | 0 | 0 | Heptane | 635 |
|   |      | B | F | 1.017 | 26.3 | 40.3 | Heptane | 2137 |
| 6 | 9.12 | A | A | 1.0 | 0 | 0 | Heptane | 635 |
|   |      | B | F | 1.017 | 26.3 | 40.3 | Heptane | 2137 |
| 6 | 9.13 | A | A | 1.0 | 0 | 0 | Heptane | 635 |
|   |      | B | F | 1.017 | 26.3 | 40.3 | Heptane | 2137 |
| 6 | 9.14 | A | A | 1.0 | 0 | 0 | Heptane | 635 |
|   |      | B | F | 1.017 | 26.3 | 40.3 | Heptane | 2137 |
| 7 | 10.1 | C | A/H | 0.40, 1.20 | 0 | 0 | Heptane | 262 |
| 7 | 10.2 | C | A/H | 0.25, 0.50 | 0 | 0 | Hexene | 1419 |
| 7 | 10.3 | C | A/H | 0.25, 0.50 | 0 | 0 | Hexene | 1009 |
| 7 | 10.4 | C | A/H | 0.50, 1.0 | 0 | 0 | Hexene | 1163 |
| 7 | 10.5 | C | A/H | 0.40, 1.20 | 0 | 0 | Heptane | 262 |
| 8 | 11.1 | A | A | 0.50 | 0 | 0 | Heptane | 320 |
|   |      | A | I | 0.505 | 0 | 0 | Heptane | 929 |
| 8 | 11.2 | A | A | 0.50 | 0 | 0 | Heptane | 320 |
|   |      | A | I | 0.505 | 0 | 0 | Heptane | 929 |

[a]This vessel was diluted to 40 pounds using hexene-1 rather than isobutane.

TABLE 2

Precontactor Feeds

| Resin Number | Precontactor Metallocene Solution 1 (lbs/hr) | Precontactor Metallocene Solution 2[a] (lbs/hr) | Precontactor Hexene Feed (lbs/hr) | Precontactor 0.1% TEA Feed (lbs/hr) | Precontactor Isobutane Feed (lbs/hr) | Precontactor Volume (Liters) |
|---|---|---|---|---|---|---|
| Table 3 | | | | | | |
| 6.1 | 0.21 | None | 0 | 0.71 | 2.58 | 0.5 |
| 6.2 | 0.26 | None | 0 | 0.71 | 2.32 | 0.5 |
| 6.3 | 0.55 | None | 0 | 0.61 | 2.73 | 0.5 |
| Table 4 | | | | | | |
| 7.1 | 0.32 | 0.24 | 0 | 0.75 | 1.86 | 0.5 |
| 7.2 | 0.31 | 0.43 | 0 | 0.85 | 1.73 | 0.5 |
| Table 5 | | | | | | |
| 8.1 | 0.2 | 0.53 | 0 | 0.79 | 3.72 | 0.5 |
| 8.2 | 0.21 | 0.41 | 0 | 0.59 | 3.79 | 0.5 |
| 8.3 | 0.33 | 0.41 | 0 | 0.61 | 2.61 | 0.5 |

TABLE 2-continued

| | Precontactor Feeds | | | | | |
|---|---|---|---|---|---|---|
| Resin Number | Precontactor Metallocene Solution 1 (lbs/hr) | Precontactor Metallocene Solution 2[a] (lbs/hr) | Precontactor Hexene Feed (lbs/hr) | Precontactor 0.1% TEA Feed (lbs/hr) | Precontactor Isobutane Feed (lbs/hr) | Precontactor Volume (Liters) |
| Table 6 | | | | | | |
| 9.1 | 0.22 | 0.43 | 0 | 0.71 | 2.59 | 0.5 |
| 9.2 | 0.22 | 0.35 | 0 | 0.69 | 2.6 | 0.5 |
| 9.3 | 0.76 | 0.18 | 0 | 0.63 | 2.67 | 0.5 |
| 9.4 | 0.82 | 0.16 | 0 | 0.62 | 2.72 | 0.5 |
| 9.5 | 0.39 | 0.10 | 0 | 0.62 | 2.68 | 0.5 |
| 9.6 | 0.39 | 0.10 | 0 | 0.62 | 2.68 | 0.5 |
| 9.7 | 0.41 | [a] | 0 | 0.68 | 1.94 | 0.5 |
| 9.8 | 0.32 | [a] | 0 | 0.62 | 2 | 0.5 |
| 9.9 | 0.45 | [a] | 0 | 0.67 | 1.96 | 0.5 |
| 9.10 | 0.21 | 0.19 | 0 | 1.01 | 2 | 0.5 |
| 9.11 | 0.17 | 0.39 | 0 | 1 | 2.02 | 0.5 |
| 9.12 | 0.33 | 0.10 | 0 | 0.99 | 1.99 | 0.5 |
| 9.13 | 0.37 | 0.11 | 0 | 1.01 | 2 | 0.5 |
| 9.14 | 0.29 | 0.10 | 0 | 1 | 2 | 0.5 |
| Table 7 | | | | | | |
| 10.1 | 0.48 | [a] | 0 | 0.95 | 1.59 | 0.5 |
| 10.2 | 0.48 | [a] | 0 | 0.49 | 4.94 | 2 |
| 10.3 | 0.86 | [a] | 0 | 0.48 | 4.63 | 2 |
| 10.4 | 0.32 | [a] | 0 | 0.51 | 4.95 | 2 |
| 10.5 | 0.27 | [a] | 0 | 0.98 | 1.59 | 0.5 |
| Table 8 | | | | | | |
| 11.1 | 0.2 | 0.48 | 0 | 0.69 | 1.43 | 0.5 |
| 11.2 | 0.21 | 0.68 | 0 | 0.75 | 1.37 | 0.5 |

[a]In examples where only one metallocene feed is listed the metallocenes were feed in a premixed solution.

EXAMPLE 5

Description of a Typical Polymerization Run

Ethylene copolymers were prepared in a continuous particle form process (also known as a slurry process) by contacting the catalyst of the present invention with ethylene and 1-hexene comonomer. The polymerization medium and polymerization temperature are thus selected such that the copolymer is produced in the form of solid particles and is recovered in that form. General polymerization reaction details are as follows.

Ethylene was dried over activated alumina was used as the monomer. Isobutane that had been degassed by fractionation and dried over activated alumina was used as the diluent.

The polymerization reactor was a liquid-full 15.2 cm diameter pipe loop having a volume of 23 (87 liters) or 27 gallons (102 liters). The fluorided silica-almina, the 0.1 wt % triethylaluminum solution in isobutane, the metallocene solution or solutions prepared as above and a portion of the total isobutane diluent were all fed to the reactor through a precontacting vessel (0.5 or 2.0 Liters), where the three ingredients contacted each other at room temperature for about 10 to 30 minutes, before entering the reaction zone. The precontactor consisted of a stirred Autoclave Engineers Magnadrive reactor with a volume of either 0.5 or 2.0 Liters as indicated in the tables below, which fed directly into the loop reactor. The chemically treated solid oxide (CTSO) was added to the precontactor through a 0.35 cc circulating ball-check feeder using a small isobutane flow, as indicated above. Occasionally some hydrogen was added to the reactor to regulate the molecular weight of the polymer product. The reactor pressure was about 4 Mpa (about 580 psi). The reactor temperature was varied over a range, from about 65° C. to about 110° C., as indicated. The polymerization reactor was operated to have a residence time of 1.25 hours. At steady-state conditions the total isobutane feed rate was about 46 liters per hour, the ethylene feed rate was about 30 lbs/hr, and the 1-hexene feed rate was varied to control the density of the polymer product. Ethylene concentration in the diluent was from about 14 to about 20 mole percent. Catalyst concentrations in the reactor are such that the CTSO system content typically ranges from 0.001 to about 1 weight percent based on the weight of the reactor contents. Polymer was removed from the reactor at the rate of about 25 lbs per hour and recovered in a flash chamber. A Vulcan dryer was used to dry the polymer under nitrogen from about 60° C. to about 80° C.

To prevent static buildup in the reactor, a small amount (<5 ppm relative to diluent) of a commercial antistatic agent sold as Stadis 450 was typically added.

EXAMPLE 6

Ethylene Polymerization Using $(\eta^5-C_5H_4{}''Bu)_2ZrCl_2$

Polymerization runs using the single metallocene, $(\eta^5-C_5H_4{}''Bu)_2ZrCl_2$ (A), fluorided silica-alumina, and triethylaluminum were conducted using the methods as described herein and in Tables 3A and 3B. Only fluorided CTSO and TEA were used in these Examples. See Table 1 for metallocene solution preparation, Table 2 for catalyst feeds to the precontactor, and Table 3A for reactor conditions.

Table 3B provides the resin and film properties for polyethylene prepared using the single metallocene catalyst comprising $(\eta^5-C_5H_4{}''Bu)_2ZrCl_2$ (A) as shown. Because the metallocene compound $(\eta^5-C_5H_4{}''Bu)_2ZrCl_2$ (A) is used as a first metallocene in many of the Examples provided herein, these data provide a baseline or control by which to compare the dual metallocene catalyst compositions.

EXAMPLE 7

Ethylene Polymerization Using ($\eta^5$-$C_5H_4''Bu)_2ZrCl_2$ and a Tightly-Bridged Metallocene Polymerization runs using the first metallocene, ($\eta^5$-$C_5H_4''Bu)_2ZrCl_2$ (A), and the tightly-bridged second metallocene, methyl-3-butenylmethylidene($\eta^5$-cyclopentadienyl)($\eta^5$-9-fluorenyl)zirconium dichloride (B), shown in Tables 4A and 4B, fluorided silica-alumina, and triethylaluminum were conducted using the methods as described herein. See Table 1 for metallocene solution preparation and Table 2 for catalyst feeds to the precontactor.

Table 4A illustrates typical polymerization and reactor conditions for polyethylene prepared using a dual metallocene catalyst comprising compounds A+B as shown, while Table 4B provides the resin and film properties for polyethylene prepared using the dual metallocene catalyst comprising compounds A+B. Thus, when ($\eta^5$-$C_5H_4''Bu)_2ZrCl_2$ is combined with a metallocene that is tightly-bridged by a single carbon atom, the resulting resin is characterized by a lower MI as compared to using ($\eta^5$-$C_5H_4''Bu)_2ZrCl_2$ alone, but also substantially decreases MD tear.

EXAMPLE 8

Ethylene Polymerization Using ($\eta^5$-$C_5H_4''Bu)_2ZrCl_2$ and a Metallocene Tightly-Bridged with a $SiMe_2$ Group Polymerization runs using the first metallocene, ($\eta^5$-$C_5H_4''Bu)_2ZrCl_2$ (A), the second metallocene, either compound C or D as shown in Tables 5A and 5B, fluorided silica-alumina, and triethylaluminum were conducted using the methods as described herein. See Table 1 for metallocene solution preparation and Table 2 for catalyst feeds to the precontactor.

Table 5A illustrates the polymerization and reactor conditions for polyethylene prepared using a dual metallocene catalyst comprising compounds A+C or A+D, as shown, while Table 5B provides the resin and film properties for polyethylene prepared using the dual metallocene catalyst comprising compounds A+C or A+D. Thus, when ($\eta^5$-$C_5H_4''Bu)_2ZrCl_2$ (A) is combined with a tightly-bridged metallocene, specifically, a metallocene bridged by a single silicon atom, the resulting resin is characterized by a lower MI as compared to using ($\eta^5$-$C_5H_4''Bu)_2ZrCl_2$ alone, but also a substantially decreased MD tear.

EXAMPLE 9

Ethylene Polymerization Using ($\eta^5$-$C_5H_4''Bu)_2ZrCl_2$ and a Loosely-Bridged Metallocene Polymerization runs using the first metallocene, ($\eta^5$-$C_5H_4''Bu)_2ZrCl_2$ (A), the second, loosely-bridged metallocene, either compound E, F, or G as shown in Tables 6A and 6B, fluorided silica-alumina, and triethylaluminum were conducted using the methods as described herein. See Table 1 for metallocene solution preparation and Table 2 for catalyst feeds to the precontactor.

Table 6A illustrates the polymerization and reactor conditions for polyethylene prepared using a dual metallocene catalyst comprising compounds A+E, A+F, or A+G, as shown, while Table 6B provides the resin and film properties for polyethylene prepared using the dual metallocene catalyst comprising compounds A+E, A+F, or A+G. Thus, when ($\eta^5$-$C_5H_4''Bu)_2ZrCl_2$ (A) is combined with a loosely-bridged metallocene, specifically, a 3- or 4-carbon atom bridged metallocene, the resulting resin is characterized by a lower MI as compared to using ($\eta^5$-$C_5H_4''Bu)_2ZrCl_2$ alone, without decreasing MD tear, and with generally decreasing haze.

This Example helps demonstrate, among other things, that under the practical conditions of a loop reactor, ($\eta^5$-$C_5H_4''Bu)_2ZrCl_2$ (A) by itself affords polymer which is too high in MI to give adequate melt strength for blowing film. Additionally, given its high MI and narrow molecular weight distribution, ($\eta^5$-$C_5H_4''Bu)_2ZrCl_2$ (A) provides a polymer with too much haze for many LLDPE film applications. Adding the second metallocene which produces higher molecular weight polymer provides a polymer with lower MI, and hence, increased melt strength for blowing film, without sacrificing useful polymer film properties such as MD tear.

EXAMPLE 10

Ethylene Polymerization Using ($\eta^5$-$C_5H_4''Bu)_2ZrCl_2$ and a More Highly-Substituted Zirconium Metallocene ($\eta^5$-$C_5H_3''BuMe)_2ZrCl_2$ (H)

Polymerization runs using the first metallocene, ($\eta^5$-$C_5H_4''Bu)_2ZrCl_2$ (A), the second, more highly-substituted metallocene, compound ($\eta^5$-$C_5H_3''BuMe)_2ZrCl_2$ (H), as shown in Tables 7A and 7B, fluorided silica-alumina, and triethylaluminum were conducted using the methods as described herein. See Table 1 for metallocene solution preparation and Table 2 for catalyst feeds to the precontactor.

Table 7A illustrates the polymerization and reactor conditions for polyethylene prepared using a dual metallocene catalyst comprising compounds A+H, while Table 7B provides the resin and film properties for polyethylene prepared using the dual metallocene catalyst comprising compounds A+H. Thus, when ($\eta^5$-$C_5H_4''Bu)_2ZrCl_2$ (A) is combined with a more highly substituted metallocene, compound ($\eta^5$-$C_5H_3''BuMe)_2ZrCl_2$ (H), specifically, a metallocene wherein the cyclopentadienyl-type ligand is more highly substituted, the resulting resin is characterized by a lower MI as compared to using ($\eta^5$-$C_5H_4''Bu)_2ZrCl_2$ alone, without substantially decreasing MD tear.

EXAMPLE 11

Ethylene Polymerization Using ($\eta^5$-$C_5H_4''Bu)_2ZrCl_2$ and its Hafnium Analog ($\eta^5$-$C_5H_4''Bu)_2HfCl_2$ (I)

Polymerization runs using the first metallocene, ($\eta^5$-$C_5H_4''Bu)_2ZrCl_2$ (A), the second hafnium metallocene ($\eta^5$-$C_5H_4''Bu)_2HfCl_2$ (I) comprising substituted cyclopentadienyl ligands as shown in Table 8A and 8B, fluorided silica-alumina, and triethylaluminum were conducted using the methods as described herein. See Table 1 for metallocene solution preparation and Table 2 for catalyst feeds to the precontactor.

Table 8A illustrates the polymerization and reactor conditions for polyethylene prepared using a dual metallocene catalyst comprising compounds A+I, while Table 8B provides the resin and film properties for polyethylene prepared using the dual metallocene catalyst comprising compounds A+I. Thus, when ($\eta^5$-$C_5H_4''Bu)_2ZrCl_2$ (A) is combined with a hafnium metallocene ($\eta^5$-$C_5H_4''Bu)_2ZrCl_2$ (I), the resulting resin is characterized by a lower MI as compared to using ($\eta^5$-$C_5H_4''Bu)_2ZrCl_2$ alone, without substantially decreasing MD tear.

TABLE 3A

Polymerization and Reactor Conditions for Polyethylene Prepared Using a Single Metallocene Catalyst Comprising Compound A as Shown.

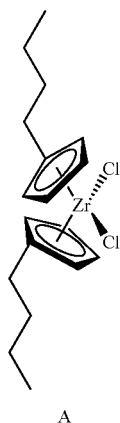

A

| Example No. | 6.1 | 6.2 | 6.3 |
|---|---|---|---|
| Chemically-Treated Solid Oxide | F-Si/AL | F-Si/AL | F-Si/AL |
| Metallocene | A | A | A in 1-hexene |
| Metallocene to Reactor (ppm) | 0.23 | 0.26 | 0.13 |
| Autoclave Residence Time (Min) | 10.19 | 10.89 | 9.17 |
| Cocatalyst Type | TEA | TEA | TEA |
| Cocatalyst (ppm) | 13.5 | 13.2 | 10 |
| Rx Temp (° F.) | 181.7 | 178.1 | 172.8 |
| Ethylene (C2) (mol %) | 14.38 | 14.02 | 14.05 |
| 1-hexene (C6) (mol %) | 5.04 | 9.80 | 8.36 |
| C6=/C2= (Mole Ratio) | 0.35 | 0.70 | 0.6 |
| $H_2$ | 0 | 0 | 0 |
| C2= Feed Rate (lb/hr) | 28.61 | 19.07 | 24.5 |
| 1-Hexene (C6) Feed Rate (lb/hr) | 8.89 | 12.62 | 11.44 |

TABLE 3A-continued

Polymerization and Reactor Conditions for Polyethylene Prepared Using a Single Metallocene Catalyst Comprising Compound A as Shown.

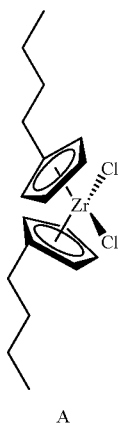

A

| Example No. | 6.1 | 6.2 | 6.3 |
|---|---|---|---|
| Total iC4 Flow Rate (lb/hr) | 51.05 | 53.84 | 60.6 |
| Solids Conc. wt. % | 28.80 | 28.4 | 26.69 |
| Polymer Production (lb/hr) | 26.00 | 24.75 | 20.8 |
| Density (pellets) (g/cc) | 0.9196 | 0.9166 | 0.9173 |
| CTSO (RPH) | 10 | 16 | 22 |
| Mass Balance Productivity (lb/lb) | 2774 | 2286 | 2240 |
| Ash Productivity (lb/lb) | 2381 | 2725 | 1538 |
| Ash (wt %) | 0.042 | 0.0367 | 0.065 |
| Mw | 78,910 | 87,630 | 86,180 |
| Mn | 35,900 | 38,100 | 34,400 |
| Mw/Mn | 2.2 | 2.3 | 2.51 |
| Precontactor Feed Metallocene Conc (Wt %) | 0.0055 | 0.0056 | 0.0014 |

TABLE 3B

Resin and Film Properties for Polyethylene Prepared Using a Single Metallocene Catalyst Comprising Compound A as Shown.

A

| Ex. No. | Metallocene | MI | HLMI | HLMI/MI | Density | Dart Impact | Spencer Impact | MD tear | TD tear | Haze | CY-a |
|---|---|---|---|---|---|---|---|---|---|---|---|
| 6.1 | A | 2.48 | 37.1 | 14.9 | 0.918 | 762 | 0.63 | 252 | 396 | 17.2 | 0.763 |
| 6.2 | A | 1.93 | 30.8 | 16.0 | 0.916 | 1316 | 0.87 | 317 | 412 | 27.3 | 0.776 |
| 6.3 | A | 1.45 | 26.4 | 18.2 | 0.9173 | >1400 | 1.29 | 269 | 353 | 19.3 | 0.727 |

TABLE 4A

Polymerization and Reactor Conditions for Polyethylene Prepared Using a Dual Metallocene Catalyst Comprising Compounds A + B as Shown.

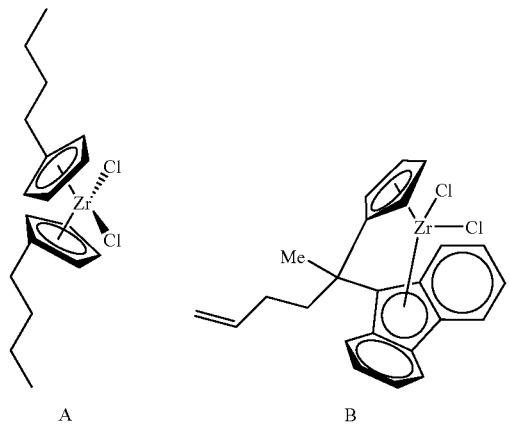

| Example No. | 7.1 | 7.2 |
|---|---|---|
| Chemically-Treated Solid Oxide | F-Si/AL | F-Si/AL |
| Metallocene | A + B | A + B |
| Metallocene B/A to Reactor (ppm) | 1.24 + 0.11 | 1.2 + 0.21 |
| Autoclave Residence Time (Min) | 11.5 | 10.96 |
| Cocatalyst Type | TEA | TEA |
| Cocatalyst (ppm) | 13.16 | 14.73 |
| Rx Temp (° F.) | 175.1 | 175.4 |
| Ethylene (mol %) | 14.61 | 15.34 |
| 1-hexene (mol %) | 2.27 | 2.92 |
| C6=/C2= (Mole Ratio) | 0.16 | 0.19 |
| $H_2$ | | |
| C2= Feed Rate (lb/hr) | 28.57 | 29.22 |
| 1-Hexene Feed Rate (lb/hr) | 4.16 | 4.62 |

TABLE 4A-continued

Polymerization and Reactor Conditions for Polyethylene Prepared Using a Dual Metallocene Catalyst Comprising Compounds A + B as Shown.

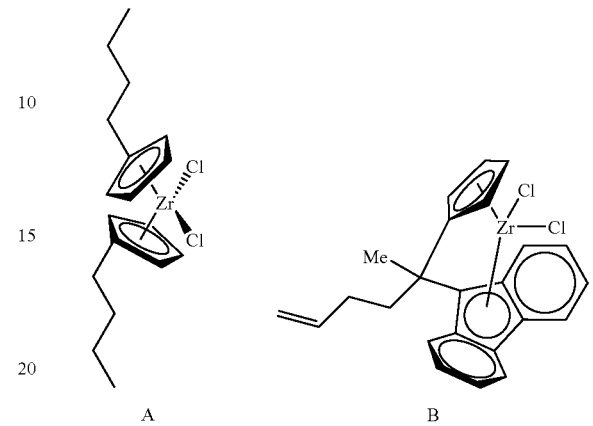

| Example No. | 7.1 | 7.2 |
|---|---|---|
| Total iC4 Flow Rate (lb/hr) | 57.1 | 57.2 |
| Solids Conc. wt. % | 27.2 | 27.3 |
| Polymer Production (lb/hr) | 24.92 | 25.33 |
| Density (pellets) (g/cc) | 0.9193 | 0.9240 |
| CTSO (RPH) | 34 | 24 |
| Mass Balance Productivity (lb/lb) | 2373 | 2373 |
| Ash Productivity (lb/lb) | 2381 | 2703 |
| Ash (wt %) | 0.042 | 0.037 |
| Mw | | |
| Mn | | |
| Mw/Mn | | |
| Precontactor Feed Metallocene B/A Conc (Wt %) | 0.022/0.0028 | 0.022/0.0028 |

TABLE 4B

Resin and Film Properties for Polyethylene Prepared Using a Dual Metallocene Catalyst Comprising Compounds A + B as Shown.

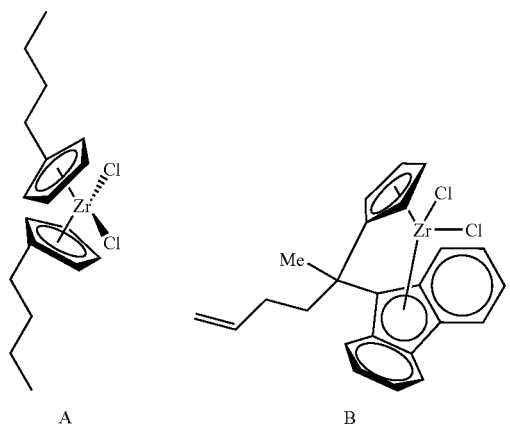

| Ex. No. | Metallocene | MI | HLMI | HLMI/MI | Density | Dart Impact | Spencer Impact | MD tear | TD tear | Haze | CY-a |
|---|---|---|---|---|---|---|---|---|---|---|---|
| 7.1 | A + B | 0.46 | 11.5 | 25.1 | 0.919 | 754 | 0.56 | 78 | 419 | 10.3 | 0.189 |
| 7.2 | A + B | 0.96 | 29.4 | 30.6 | 0.924 | 278 | 0.34 | 112 | 540 | 8.0 | 0.312 |

TABLE 5A

Polymerization and Reactor Conditions for Polyethylene Prepared Using a Dual Metallocene Catalyst Comprising Compounds A + C or A + D, as Shown.

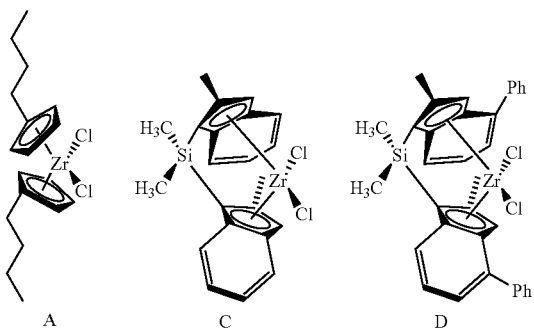

A      C      D

| Example No. | 8.1 | 8.2 | 8.3 |
|---|---|---|---|
| Chemically-Treated Solid Oxide | F-Si/AL | F-Si/AL | F-Si/AL |
| Metallocene | A + C | A + C | A + D |
| Metallocene to Reactor A + C or A + D (ppm) | 0.21 + 0.55 | 0.22 + 0.43 | 0.39 + 0.48 |
| Autoclave Residence Time (Min) | 7.57 | 7.77 | 10.05 |
| Cocatalyst Type | TEA | TEA | TEA |
| Cocatalyst (ppm) | 15.21 | 11.02 | 12.95 |
| Rx Temp (° F.) | 180.1 | 180 | 180.2 |
| Ethylene (mol %) | 13.2 | 13.62 | 14.61 |
| 1-hexene (mol %) | 5.71 | 7.48 | 7.03 |
| C6=/C2= (Mole Ratio) | 0.43 | 0.55 | 0.48 |
| $H_2$ | | | |
| C2= Feed Rate (lb/hr) | 25 | 25 | 25 |
| 1-Hexene Feed Rate (lb/hr) | 7.52 | 10.17 | 9.56 |

TABLE 5A-continued

Polymerization and Reactor Conditions for Polyethylene Prepared Using a Dual Metallocene Catalyst Comprising Compounds A + C or A + D, as Shown.

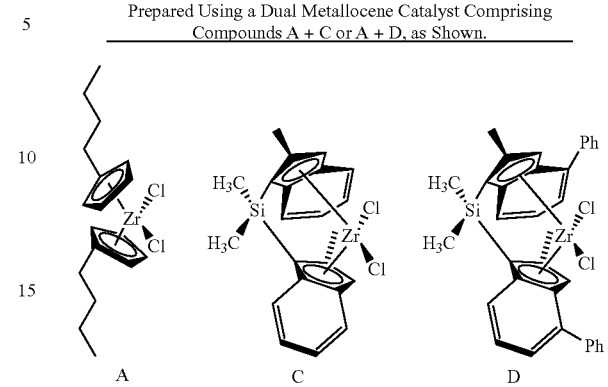

A      C      D

| Example No. | 8.1 | 8.2 | 8.3 |
|---|---|---|---|
| Total iC4 Flow Rate (lb/hr) | 52.07 | 53.11 | 47.14 |
| Solids Conc. wt. % | 25.32 | 26.15 | 26.20 |
| Polymer Production (lb/hr) | 21.8 | 23.4 | 21.8 |
| Density (pellets) (g/cc) | 0.9238 | 0.9167 | 0.9185 |
| CTSO (RPH) | 14 | 13 | 20 |
| Mass Balance Productivity (lb/lb) | 3827 | 3827 | 2422 |
| Ash Productivity (lb/lb) | 2174 | 1515 | 2128 |
| Ash (wt %) | 0.046 | 0.066 | 0.047 |
| Mw | | 112,900 | 138,380 |
| Mn | | 37,200 | 37,200 |
| Mw/Mn | | 3.03 | 3.72 |
| Precontactor Feed Metallocene A/C or A/D Conc (Wt %) | 0.0055/ 0.0055 | 0.0055/ 0.0055 | 0.0055/ 0.0055 |

TABLE 5B

Resin and Film Properties for Polyethylene Prepared Using a Dual Metallocene Catalyst Comprising Compounds A + C or A + D, as Shown.

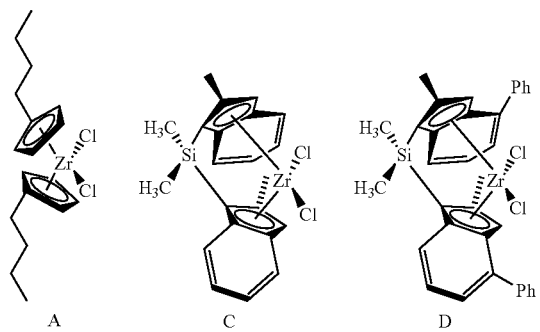

A      C      D

| Ex. No. | Example | MI | HLMI | HLMI/MI | Density | Dart Impact | Spencer Impact | MD tear | TD tear | Haze | CY-a |
|---|---|---|---|---|---|---|---|---|---|---|---|
| 8.1 | A + C | 1.04 | 24.3 | 23.4 | 0.923 | 154 | 0.36 | 68 | 347 | 21.1 | 0.079 |
| 8.2 | A + C | 1.10 | 25.3 | 23.0 | 0.916 | 456 | 0.44 | 104 | 372 | 9.4 | 0.098 |
| 8.3 | A + D | 1.10 | 22.6 | 20.5 | 0.918 | 168 | 0.36 | 80 | 409 | 25.1 | 0.06 |

TABLE 6A

Polymerization and Reactor Conditions for Polyethylene Prepared Using a Dual Metallocene Catalyst Comprising Compounds A + E, A + F, or A + G, as Shown.

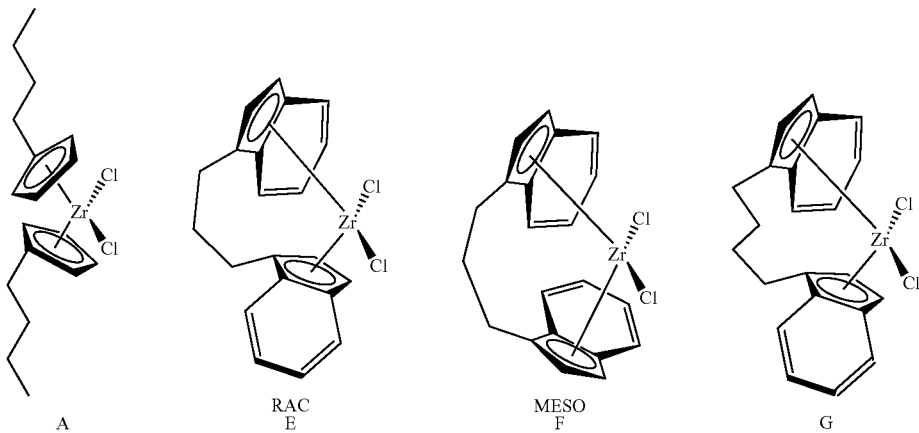

| Example No. | 9.1 | 9.2 | 9.3 | 9.4 | 9.5 | 9.6 | 9.7 |
|---|---|---|---|---|---|---|---|
| Chemically-Treated Solid Oxide | F-Si/Al | F-Si/AL | F-Si/AL | F-Si/AL | F-Si/AL | F-Si/AL | F-Si/AL |
| Metallocene | G + A | G + A | E + A | E + A | E + A | E + A | E + A |
| Metallocene G + A, E + A, or A + F to Reactor (ppm) | 018 + 0.23 | 0.2 + 0.24 | 0.45 + 0.16 | 0.2 + 0.18 | 0.38 + 0.11 | 0.38 + 0.11 | 0.86 |
| Autoclave Residence Time (Min) | 9.24 | 9.03 | 8.26 | 8.41 | 9.41 | 9.41 | 11.32 |
| Cocatalyst Type | TEA | TEA | TEA | TEA | TEA | TEA | TEA |
| Cocatalyst (ppm) | 13.08 | 13.25 | 11.17 | 11.88 | 11.42 | 11.42 | 13.58 |
| Rx Temp (° F.) | 181.6 | 181.6 | 182.8 | 180 | 182.8 | 182.8 | 180 |
| Ethylene (mol %) | 13.31 | 14.35 | 12.79 | 12.28 | 13.9 | 13.9 | 14.54 |
| 1-hexene (mol %) | 5.73 | 5.44 | 4.82 | 7.13 | 7.55 | 7.55 | 7.63 |
| C6=/C2= (Mole Ratio) | 0.43 | 0.38 | 0.38 | 0.58 | 0.54 | 0.54 | 0.52 |
| $H_2$ | | | | | | | |
| C2= Feed Rate (lb/hr) | 29 | 29.01 | 22.55 | 24.12 | 24.31 | 24.31 | 26.97 |
| 1-Hexene Feed Rate (lb/hr) | 10.65 | 10.47 | 10.92 | 10.84 | 11.13 | 11.13 | 11.42 |
| Total iC4 Flow Rate (lb/hr) | 53.03 | 53.25 | 55.7 | 53.09 | 54.84 | 54.84 | 50.87 |
| Solids Conc. wt. % | 28.3 | 28.4 | 28.7 | 30 | 30 | 30 | 26.5 |
| Polymer Production (lb/hr) | 26.67 | 26.83 | 26 | 26.83 | 27.5 | 27.5 | 24.13 |
| Density (pellets) (g/cc) | 0.9182 | 0.9198 | 0.918 | 0.9176 | 0.9183 | 0.9183 | 0.9228 |
| CTSO (RPH) | 21 | 22 | 22 | 42 | 23 | 23 | 17 |
| Mass Balance Productivity (lb/lb) | 2774 | 2774 | 3224 | 3224 | 3224 | 3224 | 2373 |
| Ash Productivity (lb/lb) | 1923 | 1887 | 1957 | 1250 | 1946 | 1946 | 3704 |
| Ash (wt %) | 0.052 | 0.053 | 0.0511 | 0.08 | 0.0514 | 0.0514 | 0.027 |
| Mw | 105,230 | 105,560 | | 108,190 | 107,120 | 107,120 | |
| Mn | 47,000 | 44,000 | | 35,000 | 42,300 | 42,300 | |
| Mw/Mn | 2.4 | 2.42 | | 3.09 | 2.53 | 2.53 | |
| Precontactor Feed G/A, E/A, or A/F Metallocene Conc (Wt %) | 0.0055/ 0.0028 | 0.0055/ 0.0028 | 0.0031/ 0.0055 | 0.0014/ 0.0055 | 0.0031/ 0.0055 | 0.0031/ 0.0055 | 0.0107$^a$ |

| Example No. | 9.8 | 9.9 | 9.10 | 9.11 | 9.12 | 9.13 | 9.14 |
|---|---|---|---|---|---|---|---|
| Chemically-Treated Solid Oxide | F-Si/AL | F-Si/AL | F-Si/AL | F-Si/AL | F-Si/AL | F-Si/AL | F-Si/AL |
| Metallocene | E + A | E + A | E + A | A + F | A + F | A + F | A + F |
| Metallocene G + A, E + A, or A + F to Reactor (ppm) | 0.67 | 1.43 | 0.24 + 0.24 | 0.19 + 0.45 | 0.39 + 0.11 | 0.43 + 0.13 | 0.33 + 0.12 |
| Autoclave Residence Time (Min) | 12.24 | 11.41 | 10.86 | 9.87 | 10.66 | 10.39 | 10.67 |
| Cocatalyst Type | TEA | TEA | TEA | TEA | TEA | TEA | TEA |
| Cocatalyst (ppm) | 13.06 | 12.84 | 20.92 | 20.24 | 20.39 | 21.26 | 20.69 |
| Rx Temp (° F.) | 179.8 | 180 | 177.5 | 177.6 | 177.7 | 177.9 | 178 |
| Ethylene (mol %) | 9.95 | 10.16 | 12.95 | 12.86 | 12.64 | 13.06 | 12.11 |
| 1-hexene (mol %) | 6.17 | 7.53 | 20.44 | 16.82 | 13.58 | 14.12 | 14.24 |
| C6=/C2= (Mole Ratio) | 0.62 | 0.74 | 1.58 | 1.31 | 1.07 | 1.08 | 1.18 |
| $H_2$ | | | | | | | |
| C2= Feed Rate (lb/hr) | 27.65 | 29.35 | 29.71 | 29.79 | 29.7 | 29.72 | 29.69 |
| 1-Hexene Feed Rate (lb/hr) | 8.29 | 10.35 | 13.61 | 12.75 | 10.48 | 11.31 | 11.19 |
| Total iC4 Flow Rate (lb/hr) | 52.7 | 52.14 | 48.57 | 48.71 | 48.44 | 47.63 | 48.52 |
| Solids Conc. wt. % | 30.4 | 28.7 | 29.3 | 29 | 30.7 | 30.3 | 31.1 |
| Polymer Production (lb/hr) | 27.42 | 26.89 | 27.5 | 27 | 27.83 | 27.5 | 28.5 |
| Density (pellets) (g/cc) | 0.9197 | 0.9175 | 0.9154 | 0.9215 | 0.9155 | 0.9165 | 0.9166 |

TABLE 6A-continued

| | | | | | | | |
|---|---|---|---|---|---|---|---|
| CTSO (RPH) | 35 | 25 | 28 | 30 | 22 | 21 | 22 |
| Mass Balance Productivity (lb/lb) | 2373 | | 3307 | 3307 | 3307 | 3307 | 3307 |
| Ash Productivity (lb/lb) | 3333 | 3125 | 3401 | 2203 | 2387 | 2160 | 2342 |
| Ash (wt %) | 0.03 | 0.032 | 0.0294 | 0.0454 | 0.0419 | 0.0463 | 0.0427 |
| Mw | | 107,040 | | | 99,200 | | 106,170 |
| Mn | | 32,700 | | | 30,900 | | 29,700 |
| Mw/Mn | | 3.27 | | | 3.21 | | 3.57 |
| Precontactor Feed G/A, E/A, or A/F Metallocene Conc (Wt %) | 0.0107[a] | 0.0162[a] | 0.0055/ 0.0055 | 0.0055/ 0.0055 | 0.0055/ 0.0055 | 0.0055/ 0.0055 | 0.0055/ 0.005 |

[a]For these examples the metallocenes were premixed during the preparation of the solutions.

TABLE 6B

Resin and Film Properties for Polyethylene Prepared Using a Dual Metallocene Catalyst Comprising Compounds A + E, A + F, or A + G, as Shown.

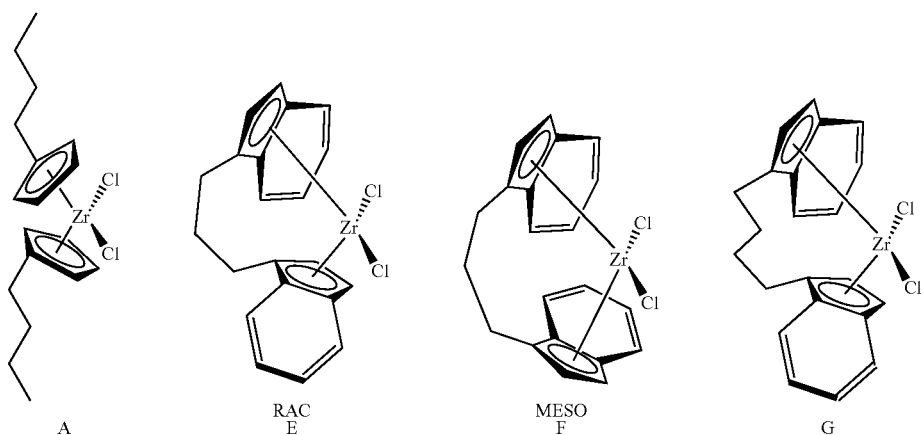

A     RAC E     MESO F     G

| Ex. No. | Example | MI | HLMI | HLMI/MI | Density | Dart Impact | Spencer Impact | MD tear | TD tear | Haze | CY-a |
|---|---|---|---|---|---|---|---|---|---|---|---|
| 9.1 | A + G | 0.85 | 14.9 | 17.5 | 0.918 | >1400 | 1.34 | 209 | 398 | 7.6 | 0.672 |
| 9.2 | A + G | 0.83 | 14.5 | 17.4 | 0.920 | 823 | 1.11 | 275 | 470 | 8.4 | 0.66 |
| 9.3 | A + E | 0.81 | 18.4 | 22.7 | 0.918 | >1400 | 1.07 | 241 | 451 | 6.9 | 0.576 |
| 9.4 | A + E | 0.84 | 16.8 | 20.0 | 0.918 | >1400 | 0.91 | 229 | 477 | 7.9 | 0.509 |
| 9.5 | A + E | 0.77 | 15.7 | 20.4 | 0.918 | >1400 | 1.00 | 309 | 471 | 6.4 | 0.566 |
| 9.6 | A + E | 0.77 | 15.7 | 20.4 | 0.918 | 1039 | 1.21 | 273 | 436 | 7.0 | 0.566 |
| 9.7 | A + E | 0.76 | 15 | 20.1 | 0.923 | 191 | 0.42 | 264 | 454 | 6.4 | 0.549 |
| 9.8 | A + E | 1.01 | 22 | 20.3 | 0.920 | 391 | 0.62 | 274 | 428 | 7.4 | 0.618 |
| 9.9 | A + E | 1.00 | 25 | 21.3 | 0.918 | 1400 | 1.02 | 246 | 383 | 8.3 | |
| 9.10 | A + F | 0.58 | 13.5 | 23.3 | 0.917 | >1400 | 1.72 | 194 | 467 | 10.1 | 0.345 |
| 9.11 | A + F | 0.6 | 15.1 | 25.2 | 0.922 | 437 | 0.36 | 274 | 747 | 7.4 | 0.569 |
| 9.12 | A + F | 1.03 | 18.6 | 18.1 | 0.916 | >1400 | 1.11 | 215.5 | 414 | 17.3 | 0.646 |
| 9.13 | A + F | 1.11 | 19.1 | 17.2 | 0.916 | >1400 | 1.23 | 271 | 441 | 9.7 | 0.648 |
| 9.14 | A + F | 0.95 | 16.9 | 17.8 | 0.917 | >1400 | 1.68 | 209 | 339 | 14.4 | 0.652 |

TABLE 7A

Polymerization and Reactor Conditions for Polyethylene Prepared
Using a Dual Metallocene Catalyst Comprising Compounds A + H, as Shown.

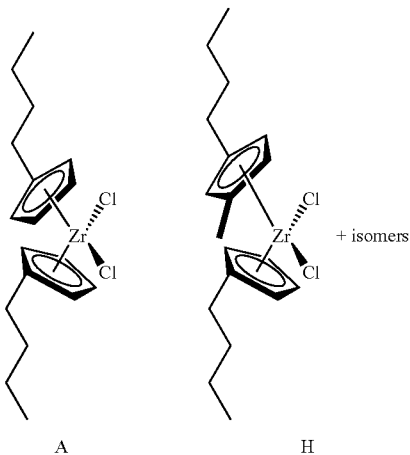

A H

| Example No. | 10.1 | 10.2 | 10.3 | 10.4 | 10.5 |
|---|---|---|---|---|---|
| Chemically-Treated Solid Oxide | F-Si/AL | F-Si/AL | F-Si/AL | F-Si/AL | F-Si/AL |
| Metallocene | A + H | A + H | A + H | A + H | A + H |
| Metallocene to Reactor (ppm) | 0.84 | 0.41 | 0.6 | 0.5 | 0.46 |
| Autoclave Residence Time (Min) | 12.43 | 24.96 | 24.09 | 24.97 | 13.3 |
| Cocatalyst Type | TEA | TEA | TEA | TEA | TEA |
| Cocatalyst (ppm) | 19.07 | 10.03 | 9.7 | 9.69 | 19.68 |
| Rx Temp (° F.) | 179.3 | 174.8 | 174.8 | 174.8 | 179.2 |
| Ethylene (mol %) | 14.23 | 13.35 | 12.79 | 13.41 | 15.66 |
| 1-hexene (mol %) | 12.55 | 2.44 | 2.55 | 2.59 | 15.52 |
| C6=/C2= (Mole Ratio) | 0.88 | 0.18 | 0.2 | 0.19 | 0.99 |
| $H_2$ (mole %) | | | | | 0.003 |
| C2= Feed Rate (lb/hr) | 19.8 | 25.87 | 25.88 | 25.9 | 29.8 |
| 1-Hexene Feed Rate (lb/hr) | 11.2 | 9.55 | 11.22 | 12.49 | 11.84 |
| Total iC4 Flow Rate (lb/hr) | 54.2 | 48.89 | 48.34 | 52.38 | 54 |
| Solids Conc. wt. % | 28.1 | 25.3 | 24.6 | 21.7 | 29.5 |
| Polymer Production (lb/hr) | 26.17 | 21.67 | 21.44 | 20 | 27.67 |
| Density (pellets) (g/cc) | 0.9189 | 0.9183 | 0.9179 | 0.9177 | 0.916 |
| CTSO (RPH) | 28 | 60 | 56 | 57 | 22 |
| Mass Balance Productivity (lb/lb) | 2825 | 1966 | 2405 | 2405 | 2854 |
| Ash Productivity (lb/lb) | 2703 | 3846 | 2222 | 2564 | 3030 |
| Ash (wt %) | 0.037 | 0.026 | 0.045 | 0.039 | 0.033 |
| Mw | | 134,760 | 124,640 | 124,060 | 101,110 |
| Mn | | 55,950 | 49,760 | 51.130 | 35,600 |
| Mw/Mn | | 2.41 | 2.5 | 2.43 | 2.84 |
| Precontactor Feed | | | | | |
| Metallocene Conc (Wt %) | 0.0088 | 0.0042 | 0.0034 | 0.0083 | 0.0088 |
| Metallocene Mixed Feed A/H Wt. Ratio | 3:1 | 2:1 | 2:1 | 2:1 | 3:1 |
| Precontactor Metallocene Feed (lbs/hr) | 0.48 | 0.48 | 0.86 | 0.32 | 0.27 |

TABLE 7B

Resin and Film Properties for Polyethylene Prepared Using a Dual Metallocene Catalyst Comprising Compounds A + H, as Shown.

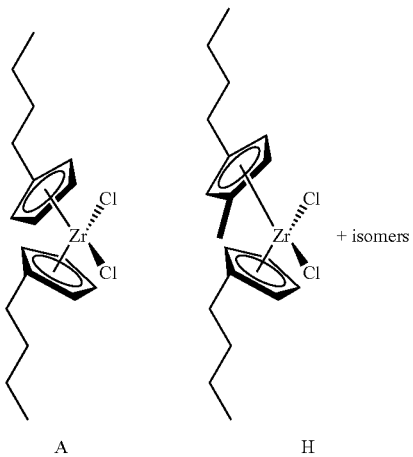

| Ex. No. | Metallocene | MI | HLMI | HLMI/MI | Density | Dart Impact | Spencer Impact | MD tear | TD tear | Haze | CY-a |
|---|---|---|---|---|---|---|---|---|---|---|---|
| 10.1 | A + H | 0.89 | 15 | 16.9 | 0.918 | >1400 | 0.72 | 216 | 367 | 11.4 | 0.585 |
| 10.2 | A + H | 1.03 | 17.46 | 17.0 | 0.9183 | 1292 | 1 | 243 | 413 | 16.4 | 0.629 |
| 10.3 | A + H | 1.31 | 23.16 | 17.7 | 0.9179 | 1268 | 0.99 | 279 | 446 | 22.6 | 0.614 |
| 10.4 | A + H | 1.33 | 23.39 | 17.6 | 0.9177 | 1007 | 0.7 | 297 | 472 | 29.9 | 0.623 |
| 10.5 | A + H | 0.98 | 16.53 | 16.9 | 0.9160 | 1400 | 1.66 | 217 | 402 | 13.3 | 0.655 |

TABLE 8A

Polymerization and Reactor Conditions for Polyethylene Prepared Using a Dual Metallocene Catalyst Comprising Compounds A + I, as Shown.

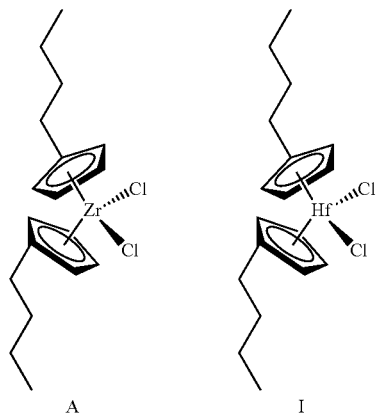

| Example No. | 11.1 | 11.2 |
|---|---|---|
| Chemically-Treated Solid Oxide | F-Si/AL | F-Si/AL |
| Metallocene | A + I | A + I |
| Metallocene to Reactor (ppm) | 0.11 + 0.26 | 0.11 + 0.38 |
| Autoclave Residence Time (Min) | 13.57 | 12.76 |
| Cocatalyst Type | TEA | TEA |
| Cocatalyst (ppm) | 13.73 | 14.11 |
| Rx Temp (° F.) | 176.3 | 176.2 |
| Ethylene (mol %) | 15.14 | 14.82 |
| 1-hexene (mol %) | 11.79 | 11.3 |
| C6=/C2= (Mole Ratio) $H_2$ | 0.78 | 0.76 |
| C2 = Feed Rate (lb/hr) | 29.3 | 29.3 |
| 1-Hexene Feed Rate (lb/hr) | 9.61 | 9.75 |
| Total iC4 Flow Rate (lb/hr) | 50.27 | 50.52 |
| Solids Conc. wt. % | 28.1 | 27.7 |
| Polymer Production (lb/hr) | 25.5 | 25.27 |
| Density (pellets) (g/cc) | 0.9185 | 0.9181 |
| CTSO (RPH) | 29 | 35 |
| Mass Balance Productivity (lb/lb) | 2222 | 2222 |

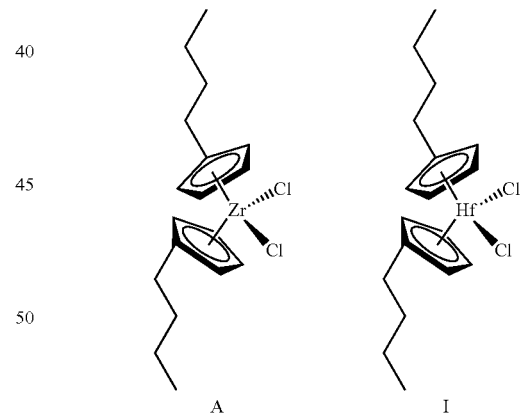

TABLE 8A-continued

Polymerization and Reactor Conditions for Polyethylene Prepared Using a Dual Metallocene Catalyst Comprising Compounds A + I, as Shown.

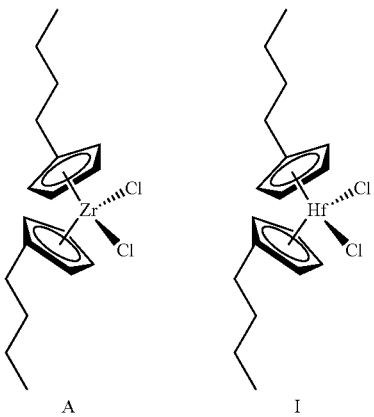

A         I

| Example No. | 11.1 | 11.2 |
|---|---|---|
| Ash Productivity (lb/lb) | 2941 | 2941 |
| Ash (wt %) | 0.034 | 0.049 |
| Mw | 102,610 | 118,520 |
| Mn | 36,800 | 39,200 |
| Mw/Mn | 2.79 | 3.02 |
| Precontactor Feed A/I Metallocene Conc (Wt %) | 0.0028/0.0028 | 0.0028/0.0028 |
| Metallocene Mixed Feed Wt. Ratio | 0.423 | 0.289 |
| Precontactor Metallocene A/I Feed (lbs/hr) | 0.2 | 0.21 |
| Metallocene Feed (lbs/hr) | 0.48 | 0.68 |

TABLE 8B

Resin and Film Properties for Polyethylene Prepared Using a Dual Metallocene Catalyst Comprising Compounds A + I, as Shown.

A         I

| Ex. No. | Metallocene | MI | HLMI | HLMI/MI | Density | Dart Impact | Spencer Impact | MD tear | TD tear | Haze | CY-a |
|---|---|---|---|---|---|---|---|---|---|---|---|
| 11.1 | A + I | 1.09 | 20.8 | 19.1 | 0.917 | 688 | 0.65 | 242 | 413 | 20.6 | 0.534 |
| 11.2 | A + I | 0.84 | 16.2 | 19.3 | 0.917 | 727 | 0.85 | 196 | 447 | 11.6 | 0.499 |

We claim:

1. A homopolymer or copolymer of ethylene having a melt index (MI) from about 0.3 to about 2.0 dg/min, a high load melt index (HLMI) to melt index ratio (HLMI/MI) from about 16.5 to about 25, a polydispersity index ($M_w/M_n$) from about 2 to about 6, a CY-a parameter from about 0.45 to about 0.70, a MD Elmendorf tear resistance greater than about 150 g for a 1 mil blown film, a TD Elmendorf tear resistance greater than about 350 g for a 1 mil blown film, and a Dart impact strength greater than about 800 g for a 1 mil blown film.

2. The homopolymer or copolymer of claim 1, further characterized by a high load melt index (HLMI) from about 10 to about 30 dg/min.

3. The homopolymer or copolymer of claim 1, further characterized by a HLMI/MI ratio from about 17 to about 24.

4. The homopolymer or copolymer of claim 1, further characterized by a density from about 0.91 to about 0.94 g/cm$^3$.

5. The homopolymer or copolymer of claim 1, further characterized by a film haze less than about 25% for a 1 mil blown film.

6. The homopolymer or copolymer of claim 1, further characterized by a CY-a parameter from about 0.50 to about 0.65.

7. The homopolymer or copolymer of claim 1, further characterized by a Spencer impact strength greater than about 0.7 J for a 1 mil blown film.

8. An article comprising the homopolymer or copolymer of claim 1.

9. The article of claim 8, wherein the article is a household container, an utensil, a film product, a drum, a fuel tank, a pipe, a geomembrane, or a liner.

10. The article of claim 8, wherein the article is a blown film product.

11. The homopolymer or copolymer of claim 1, further characterized by a Dart impact strength greater than about 1200 g for a 1 mil blown film.

12. A homopolymer or copolymer of ethylene having a melt index (MI) from about 0.3 to about 2.0 dg/min, a high load melt index (HLMI) to melt index ratio (HLMI/MI) from about 16.5 to about 25, a polydispersity index ($M_w/M_n$) from about 2.6 to about 4, a CY-a parameter from about 0.45 to about 0.70, a MD Elmendorf tear resistance greater than about 150 g for a 1 mil blown film, a TD Elmendorf tear resistance greater than about 350 g for a 1 mil blown film, and a Dart impact strength greater than about 600 g for a 1 mil blown film.

13. The homopolymer or copolymer of claim 12, further characterized by a high load melt index (HLMI) from about 10 to about 30 dg/min.

14. The homopolymer or copolymer of claim 12, further characterized by a HLMI/MI ratio from about 17 to about 24.

15. The homopolymer or copolymer of claim 12, further characterized by a density from about 0.91 to about 0.94 g/cm$^3$.

16. The homopolymer or copolymer of claim 12, further characterized by a film haze less than about 25% for a 1 mil blown film.

17. The homopolymer or copolymer of claim 12, further characterized by a CY-a parameter from about 0.50 to about 0.65.

18. The homopolymer or copolymer of claim 12, further characterized by a Spencer impact strength greater than about 0.7 J for a 1 mil blown film.

19. An article comprising the homopolymer or copolymer of claim 12.

20. The article of claim 19, wherein the article is a household container, an utensil, a film product, a drum, a fuel tank, a pipe, a geomembrane, or a liner.

21. The article of claim 19, wherein the article is a blown film product.

* * * * *